US008533773B2

(12) United States Patent
Maes

(10) Patent No.: US 8,533,773 B2
(45) Date of Patent: Sep. 10, 2013

(54) METHODS AND SYSTEMS FOR IMPLEMENTING SERVICE LEVEL CONSOLIDATED USER INFORMATION MANAGEMENT

(75) Inventor: Stephane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 240 days.

(21) Appl. No.: 12/948,450

(22) Filed: Nov. 17, 2010

(65) Prior Publication Data

US 2011/0126261 A1 May 26, 2011

Related U.S. Application Data

(60) Provisional application No. 61/262,958, filed on Nov. 20, 2009.

(51) Int. Cl.
*G06F 21/00* (2006.01)

(52) U.S. Cl.
USPC .................................................. 726/1; 726/22

(58) Field of Classification Search
None
See application file for complete search history.

(56) References Cited

U.S. PATENT DOCUMENTS

| 5,414,812 | A | 5/1995 | Filip et al. |
|---|---|---|---|
| 5,613,060 | A | 3/1997 | Britton et al. |
| 5,699,513 | A | 12/1997 | Feigen et al. |
| 5,737,321 | A | 4/1998 | Takahashi |
| 5,786,770 | A | 7/1998 | Thompson |
| 5,850,517 | A | 12/1998 | Verkler et al. |
| 5,867,665 | A | 2/1999 | Butman et al. |
| 5,946,634 | A | 8/1999 | Korpela |
| 6,115,690 | A | 9/2000 | Wong |
| 6,119,104 | A | 9/2000 | Brumbelow |
| 6,128,645 | A | 10/2000 | Butman et al. |
| 6,157,941 | A | 12/2000 | Verkler et al. |
| 6,163,800 | A | 12/2000 | Ejiri |
| 6,192,414 | B1 | 2/2001 | Horn |
| 6,230,271 | B1 | 5/2001 | Wadlow et al. |
| 6,272,556 | B1 | 8/2001 | Gish |
| 6,275,857 | B1 | 8/2001 | McCartney |

(Continued)

FOREIGN PATENT DOCUMENTS

| EP | 2 034 748 A1 | 3/2009 |
| WO | WO 2007134468 A1 | 11/2007 |

OTHER PUBLICATIONS

U.S. Appl. No. 11/926,738, filed Oct. 29, 2007, Notice of Allowance mailed Aug. 5, 2011, 13 pages.

(Continued)

*Primary Examiner* — Fikremariam A Yalew
(74) *Attorney, Agent, or Firm* — Kilpatrick Townsend & Stockton LLP

(57) ABSTRACT

Embodiments of the invention provide methods and systems for implementing service level consolidated user information management. According to one embodiment, a method comprises intercepting, at a policy enforcer, a manipulation request of data. The method may further include analyzing the request to determine which data the manipulation request is associated with and, based on that analysis, selecting a policy from a plurality of policies. Furthermore, the method may execute the selected policy. The policy may be configured to direct the policy enforcer to allow the manipulation request to pass through to the associated destination data system to process the request, delegate processing of the manipulation request to at least one of a plurality of data systems, or process the manipulation request by the policy enforcer.

19 Claims, 17 Drawing Sheets

(56) References Cited

U.S. PATENT DOCUMENTS

| | | |
|---|---|---|
| 6,336,138 B1 | 1/2002 | Caswell et al. |
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,868,413 B1 | 3/2005 | Grindrod et al. |
| 6,965,902 B1 | 11/2005 | Ghatate |
| 6,978,348 B2 | 12/2005 | Belknap et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,072,653 B1 * | 7/2006 | Sladek et al. ............... 455/432.3 |
| 7,073,055 B1 | 7/2006 | Freed et al. |
| 7,089,317 B2 | 8/2006 | Jeyaraman et al. |
| 7,106,848 B1 | 9/2006 | Barlow et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,447,793 B2 | 11/2008 | Morioka |
| 7,448,022 B1 | 11/2008 | Ram et al. |
| 7,454,399 B2 | 11/2008 | Matichuk |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,660,297 B2 | 2/2010 | Fisher et al. |
| 7,676,813 B2 | 3/2010 | Bisset et al. |
| 7,716,310 B2 | 5/2010 | Foti |
| 7,720,926 B2 | 5/2010 | Asahara |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,925,727 B2 | 4/2011 | Sullivan et al. |
| 7,933,397 B2 | 4/2011 | Jain |
| 8,023,971 B2 | 9/2011 | Egli |
| 8,032,920 B2 | 10/2011 | Maes |
| 8,036,362 B1 | 10/2011 | Skinner |
| 8,068,860 B1 | 11/2011 | Midkiff |
| 8,073,810 B2 | 12/2011 | Maes |
| 8,090,848 B2 | 1/2012 | Maes |
| 8,114,555 B2 | 2/2012 | Leonida et al. |
| 8,121,278 B2 | 2/2012 | Leigh et al. |
| 8,161,171 B2 | 4/2012 | Maes |
| 8,214,503 B2 | 7/2012 | Maes |
| 8,230,449 B2 | 7/2012 | Maes |
| 8,255,470 B2 | 8/2012 | Jackson et al. |
| 2001/0028649 A1 | 10/2001 | Pogossiants et al. |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0111848 A1 | 8/2002 | White |
| 2002/0143819 A1 | 10/2002 | Han et al. |
| 2002/0144119 A1 | 10/2002 | Benatar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0131076 A1 | 7/2003 | Nelson et al. |
| 2003/0135553 A1 | 7/2003 | Pendakur |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0093593 A1 | 5/2004 | Jhanwar et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1 | 7/2004 | Arellano et al. |
| 2004/0153545 A1 | 8/2004 | Pandaya et al. |
| 2004/0161090 A1 | 8/2004 | Digate et al. |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0053227 A1 | 3/2006 | Ye et al. |
| 2006/0072474 A1 | 4/2006 | Mitchell |
| 2006/0080117 A1 | 4/2006 | Carr et al. |

| | | |
|---|---|---|
| 2006/0104306 A1 | 5/2006 | Adamczyk et al. |
| 2006/0104431 A1 | 5/2006 | Emery et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0061397 A1 | 3/2007 | Gregorat et al. |
| 2007/0088836 A1 | 4/2007 | Tai et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118662 A1 | 5/2007 | Vishwanathan et al. |
| 2007/0150480 A1 | 6/2007 | Hwang et al. |
| 2007/0150936 A1 | 6/2007 | Maes |
| 2007/0182541 A1 | 8/2007 | Harris et al. |
| 2007/0189466 A1 | 8/2007 | Croak et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0080479 A1* | 4/2008 | Maes ........................... 370/352 |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0151768 A1 | 6/2008 | Liu |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0222694 A1* | 9/2008 | Nakae ............................... 726/1 |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0034426 A1 | 2/2009 | Luft et al. |
| 2009/0086950 A1 | 4/2009 | Vendrow et al. |
| 2009/0093240 A1 | 4/2009 | Lang |
| 2009/0112875 A1 | 4/2009 | Maes |
| 2009/0119303 A1 | 5/2009 | Rio et al. |
| 2009/0125595 A1 | 5/2009 | Maes |
| 2009/0132717 A1 | 5/2009 | Maes |
| 2009/0187919 A1 | 7/2009 | Maes |
| 2009/0190603 A1 | 7/2009 | Damola et al. |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0228584 A1 | 9/2009 | Maes et al. |
| 2009/0306834 A1 | 12/2009 | Hjelm et al. |
| 2009/0328051 A1 | 12/2009 | Maes |
| 2010/0037157 A1 | 2/2010 | Chang et al. |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Merino Gonzalez et al. |
| 2010/0128696 A1 | 5/2010 | Fantini et al. |
| 2010/0153865 A1 | 6/2010 | Barnes et al. |
| 2010/0185772 A1 | 7/2010 | Wang et al. |
| 2010/0192004 A1 | 7/2010 | Bauchot et al. |
| 2010/0281488 A1 | 11/2010 | Krishnamurthy et al. |
| 2011/0035443 A1 | 2/2011 | Jensen |
| 2011/0125909 A1 | 5/2011 | Maes |
| 2011/0125913 A1 | 5/2011 | Maes |
| 2011/0134804 A1 | 6/2011 | Maes |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |
| 2011/0258619 A1 | 10/2011 | Wookey |
| 2012/0045040 A1 | 2/2012 | Maes |
| 2012/0047506 A1 | 2/2012 | Maes |
| 2012/0173745 A1 | 7/2012 | Maes |

OTHER PUBLICATIONS

U.S. Appl. No. 11/943,101, filed Nov. 20, 2007, Office Action mailed Jul. 28, 2011, 11 pages.
U.S. Appl. No. 11/951,500, filed Dec. 6, 2007, Advisory Action mailed Jul. 15, 2011, 3 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 11/357,653, filed Feb. 16, 2006, Final Office Action dated Aug. 2, 2011, 19 pages.
U.S. Appl. No. 12/544,459, filed Aug. 20, 2009, Notice of Allowance mailed Aug. 22, 2011, 8 pages.
U.S. Appl. No. 11/949,930, filed Dec. 4, 2007, Office Action mailed Sep. 29, 2011, 19 pages.
U.S. Appl. No. 12/014,387, filed Jan. 15 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
U.S. Appl. No. 11/024,160, filed Dec. 27, 2004, Maes.
Andrews, Tony et al., Business Process Execution Language for Web Services, Version 1.1, BEA Systems, International Business Machines Corporation, SAP AG, Siebel Systems, May 5, 2003, 31 pages.
Burger, E. et al., "Deploying CCXML for Application-Layer Call Control," Aug. 2006, 11 pages.

International Search Report and Written Opinion of PCT/US2010/ 037074 mailed Jun. 1, 2011, 16 pages.
Kim et al., "Implementation of Third Party Based Call Control using Parlay Network API in SIP Environment," ICOIN 2003, LNCS 2662, 2003, pp. 416-425.
Liberty Architecture Overview, Liberty Alliance Project Version 1.1, Piscataway New Jersey, Jan. 15, 2003, 44 pages.
Maes, Stephane, Multi-modal Browser Architecture, Overview on the support of multi-modal browsers in 3GPP, IBM Research Mobile Speech Solutions and Conversational Multi-modal Computing, http://www.w3.org, accessed May 26, 2003, 25 pages.
Maes, Stephane, Multi-modal Web IBM Position W3C/WAP Workshop, IBM Research Human Language Technologies, http://www.w3.org, accessed May 26, 2003, 9 pages.
Maretzke, Michael, "JAIN SLEE Technology Overview," <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet," <http://java.sun.com/products/jain/JSLEE-SIPServlet.pdf, 2003, 13 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, http://www.linktionary.com/policy.html, accessed Aug. 2, 2004, 4 pages.
Romellini, C. et al., "CCXML: The Power of Standardization," Loquendo, Sep. 27, 2005, 7 pages.
Seely, Scott, "XML and Web Services Security: Understanding WS-Security," Microsoft Corporation, 2002, 11 pages.
Simpson et al., Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm, accessed May 26, 2003, 5 Pages.
Sundsted, Todd E., With Liberty and single sign-on for all, The Liberty Alliance Project seeks to solve the current online identity crisis Java World, www.javaworld.com/javaworld/jw-02-2002/jw-0215-liberty.html, accessed May 26, 2003, 7 pages.
The Parlay Group, "Specifications," <http://web.archive.org/web/20050114014707/www.parlay.org/specs/index.asp>, Jan. 14, 2005, 2 pages.
Thomas, Ann M., "Registering a Web Service in UDDI," SOA World Magazine, Sep. 26, 2003, 9 pages.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Final Office Action mailed May 10, 2010, 15 pages.
U.S. Appl. No. 11/848,347, filed Aug. 31, 2007, Office Action mailed Oct. 29, 2009, 12 pages.
U.S. Appl. No. 11/848,347, filed Aug. 31, 2007, Office Action mailed Sep. 30, 2010, 19 pages.
U.S. Appl. No. 11/848,347, filed Aug. 31, 2007, Final Office Action mailed Mar. 7, 2011, 21 pages.
U.S. Appl. No. 11/848,347, filed Aug. 31, 2007, Advisory Action mailed May 23, 2011, 3 pages.
U.S. Appl. No. 11/877,129, filed Oct. 23, 2007, Advisory Action mailed Jun. 3, 2010, 2 pages.
U.S. Appl. No. 11/877,129, filed Oct. 23, 2007, Final Office Action mailed Mar. 29, 2010, 17 pages.
U.S. Appl. No. 11/877,129, filed Oct. 23, 2007, Notice of Allowance mailed Aug. 5, 2010, 6 pages.
U.S. Appl. No. 11/877,129, filed Oct. 23, 2007, Office Action mailed Sep. 28, 2009, 15 pages.
U.S. Appl. No. 11/926,738, filed Oct. 29, 2007, Final Office Action mailed Jun. 29, 2010, 12 pages.
U.S. Appl. No. 11/926,738, filed Oct. 29, 2007, Office Action mailed Feb. 24, 2010, 12 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 11/926,738, filed Oct. 29, 2007, Final Office Action mailed Mar. 17, 2011, 13 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Advisory Action mailed Apr. 16, 2010, 3 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Office Action mailed Jul. 8, 2009, 9 pages.
U.S. Appl. No. 11/943,101, filed Nov. 20, 2007, Office Action mailed Aug. 27, 2010, 11 pages.
U.S. Appl. No. 11/943,101, filed Nov. 20, 2007, Final Office Action mailed Feb. 14, 2011, 11 pages.
U.S. Appl. No. 11/943,101, filed Nov. 20, 2007, Advisory Action mailed Apr. 28, 2011, 3 pages.
U.S. Appl. No. 11/951,500, filed Dec. 6, 2007, Advisory Action mailed Jun. 24, 2010, 2 pages.
U.S. Appl. No. 11/951,500, filed Dec. 6, 2007, Final Office Action mailed Mar. 30, 2010, 26 pages.
U.S. Appl. No. 11/951,500, filed Dec. 6, 2007, Office Action mailed Sep. 22, 2009, 24 pages.
U.S. Appl. No. 11/951,500, filed Dec. 6, 2007, Office Action mailed Sep. 1, 2010, 30 pages.
U.S. Appl. No. 11/951,500, filed Dec. 6, 2007, Final Office Action mailed Apr. 14, 2011, 33 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 10/855,999, filed May 28, 2004, Office Action dated Jun. 24, 2010, 20 pages.
U.S. Appl. No. 10/855,999, filed May 28, 2004, Final Office Action dated Jan. 5, 2011, 19 pages.
U.S. Appl. No. 10/855,999, filed May 28, 2004, Advisory Action dated Mar. 16, 2011, 3 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Final Office Action dated Sep. 27, 2010, 8 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005 Office Action dated Aug. 5, 2008, 18 pages.
U.S. Appl. No. 11/024,160, filed Dec. 27, 2004, Office Action dated Feb. 7, 2011, 11 pages.
U.S. Appl. No. 11/024,160, filed Dec. 27, 2004, Advisory Action dated Feb. 18, 2010, 3 pages.

U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/024,160, filed Dec. 27, 2004, Final Office Action dated Jun. 1, 2011, 11 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Advisory Action dated Jan. 18, 2011, 2 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 11/939,705, filed Nov. 14, 2007, Office Action mailed Oct. 4, 2010, 21 pages.
U.S. Appl. No. 11/939,705, filed Nov. 14, 2007, Final Office Action mailed Mar. 17, 2011, 21 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 12/019,335, filed Jan. 24, 2008, Office Action mailed May 23, 2011, 18 pages.
U.S. Appl. No. 12/364,642, filed Feb. 3, 2009, Office Action dated Dec. 20, 2010, 18 pages.
U.S. Appl. No. 11/357,653, filed Feb. 16, 2006, Office Action dated Jan. 20, 2011, 18 pages.
U.S. Appl. No. 12/544,459, filed Aug. 20, 2009, Office Action mailed Mar. 2, 2011, 10 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Final Office Action mailed Oct. 6, 2010, 20 pages.
U.S. Appl. 12/019,299, filed Jan. 24, 2008, Office Action mailed Mar. 31, 2010, 13 pages.
U.S. Appl. No. 12/019,299, filed Jan. 24, 2008, Office Action mailed Jan. 24, 2011, 16 pages.
Wikipedia, "Parlay," <http://web.archive.org/web/20050130172632/en.wikipedia.org/wiki/Parlay>, Jan. 30, 2005, 3 pages.
Wikipedia, "Object-Oriented Programming," <http://web.archive.org/web/20051211141918/http://en.wikipedia.org/wiki/Object-oriented_programming>, Dec. 11, 2005, 10 pages.
Wikipedia, "OSI model," <http://web.archive.org/web/20050907132012/http://en.wikipedia.org/wiki/Osi_model>, Sep. 7, 2005, 8 pages.
U.S. Appl. No. 12/364,642, filed Feb. 3, 2009.
U.S. Appl. No. 11/357,653, filed Feb. 16, 2006.
U.S. Appl. No. 12/544,459, filed Aug. 20, 2009 now US.
U.S. Appl. No. 12/544,471, filed Aug. 20, 2009.
U.S. Appl. No. 12/544,484, filed Aug. 20, 2009.
U.S. Appl. No. 12/490,540, filed Jun. 24, 2009.
U.S. Appl. No. 11/949,930, filed Dec. 4, 2007.
U.S. Appl. No. 11/969,343, filed Jan. 4, 2008.
U.S. Appl. No. 12/014,387, filed Jan. 15, 2008.
U.S. Appl. No. 12/018,718, filed Jan. 23, 2008.
U.S. Appl. No. 12/019,299, filed Jan. 24, 2008.
U.S. Appl. No. 12/948,247, filed Nov. 17, 2010.
U.S. Appl. No. 12/949,287, filed Nov. 18, 2010.
U.S. Appl. No. 12/791,129, filed Jun. 1, 2010.
U.S. Appl. No. 12/949,183, filed Nov. 18, 2010.
U.S. Appl. No. 12/957,697, filed Dec. 1, 2010.
U.S. Appl. No. 13/029,219, filed Feb. 17, 2011.
U.S. Appl. No. 13/029,226, filed Feb. 17, 2011.
U.S. Appl. No. 12/957,740, filed Dec. 1, 2010.
U.S. Appl. No. 13/416,413, filed Mar. 9, 2012.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
Author Unknown, "Assuming Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/943,101, filed Nov. 20, 2007, Notice of Allowance mailed Dec. 9, 2011, 7 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Advisory Action dated Oct. 12, 2011, 3 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
3rd Generation Partnership Project 2, "Presence Service: Architecture and Functional Description", doc. No. 3GPP2 X.S0027-001-0, published on Sep. 2004, 32 pages.
Day, et al., "RFC 2778, A Model for Presence and Instant Messaging", published on Feb. 2000, 12 pages.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/070,317, filed Mar. 1, 2005, Notice of Allowance dated Oct. 19, 2012, 11 pages.

U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action mailed Oct. 29, 2012, 3 pages.
U.S. Appl. No. 12/019,299, filed Jan. 24, 2008, Non Final Office Action mailed Dec. 7, 2012, 21 pages.
U.S. Appl. No. 12/948,247, filed Nov. 17, 2010, Final Office Action mailed Feb. 11, 2013, 25 pages.
U.S. Appl. No. 12/791,129, filed Jun. 1, 2010, Final Office Action mailed Dec. 7, 2012, 9 pages.
U.S. Appl. No. 12/949,183, filed Nov. 18, 2010, Non-final Office Action mailed Nov. 16, 2012, 69 pages.
U.S. Appl. No. 12/949,287, filed Nov. 18, 2010, Non-final Office Action mailed Nov. 19, 2012, 70 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 13/029,219, filed Feb. 17, 2011, Non-Final Office Action mailed Mar. 20, 2013, 65 pages.
Author Unknown, "Assuring Quality of Experience for IPTV—White Paper," Heavy Reading, Jul. 2006, 18 pages.
U.S. Appl. No. 11/848,347, filed Aug. 31, 2007, Notice of Allowance mailed Mar. 2, 2012, 9 pages.
U.S. Appl. No. 11/951,500, filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.
U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. App. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.

* cited by examiner

METHODS AND SYSTEMS FOR IMPLEMENTING SERVICE LEVEL CONSOLIDATED USER INFORMATION MANAGEMENT

This application claims priority to U.S. Provisional Application No. 61/262,958 filed Nov. 20, 2009 entitled "Methods And Systems For Implementing Service Level Consolidated User Information Management", which is incorporated by reference herein in its entirety.

BACKGROUND OF THE INVENTION

Embodiments of the present invention relate generally to methods and systems for implementing service level consolidated user information management and more particularly to providing a policy enforcing mechanism to manage routing of requests related to user information.

As an ever increasing number of services are being offered by various network providers, there is a corresponding increase in the number of systems, devices, applications, and components that utilize and store data for customers. Data typically is stored in databases as either structured or unstructured data. Directories (e.g., Lightweight Directory Access Protocol (LDAP) directories) can be used to store the data, as well as various schemas. XML data can be stored in XML-aware databases and repositories such as are found in XML Data Management (XDM) servers allow storage and exchange of XML data. Other examples include dynamic data such as network information (e.g., Home Subscriber Server (HSS) data, Home Location Register (HLR) data), presence information, location from network resources, etc. Data that may be considered for aggregation includes: Operations Support System (OSS) and Business Support System (BSS) data such as subscription data, account information, billing information, bills, inventory of assets, etc. (all of this information can be represented in TMF Shared Information/Data (SID) data model). All of these are particular examples of data repositories.

Existing systems used to capture, describe, present, etc. user profiles do not provide a view or aggregation of data from other domains, where data manipulation can be accomplished, accompanied by, or conditioned by execution of a policy (i.e., any combination of any condition and any action) that may call other systems to perform tasks that may update or result in updates of the data as needed, and that provide a view of the updated results or that may call other systems to perform tasks as a result of the update. Typically, these other systems are the "master controller" or "owner" of the data that is viewed. Data manipulation then is typically done as a request to change data in a system, a security check or identity authentication/validation, and a change of data by the database or repository. Such approaches can lead to problems in that changes made in one system might not align or be consistent with other systems using the same data, or consistent with related data in the same or other systems. As such, when a change takes place, the other data should be changed by other processes that result from the change or processes should be able to be initiated which result from the change to ensure that the other systems are properly updated.

Certain information thus overlaps or is related to other information stored for different services or in different repositories. Unfortunately, it is usually not practical for most entities to rewrite the schemas or redesign all the systems and services to use a common data model, single repository, single point of access, etc. As such, there typically is no way to easily treat the various repositories as a single data source that is readily available to applications, users, etc.

A significant problem thus exists in the fact that updating information in one data repository may require corresponding changes or updates in other repositories and/or running processes/workflows, with each repository storing information for multiple applications. In order to update data in a repository, the overall system assumes that several processes, workflows, applications, or at an initial or intermediate step, and that these applications have executed their own processes may have changed the context or data elsewhere. As such, these flows are not triggered and must separately manually (e.g., via a check list or the like) or consistency of the data must be periodically checked and updated as a result. So currently there are often many inconsistencies as a result, at least till reconciliation is performed. Or alternatively such approaches to integrate do not work and cannot be used to allow data updates via the profile. In other words, changes must be done on all systems when a change is to take place, as opposed to a request to a profile that carries the changes through to all systems effected.

For example, adding a subscription for a user in a BSS may also require updating support data and asset data (e.g. in an OSS, Network, or run time environment like service delivery platform (SDP)), as well as ensuring that some provisioning, activation, fulfillment, and/or billing takes place, as well as Enterprise Resource Planning Software (ERP) flows, (e.g., to supply equipment like delivering a phone, modem, or laying a cable, etc.) etc. If the data is allowed to be updated without following all such flows, data existing elsewhere (e.g. catalog or provisioning flows, new rates, inventories of assets associated to a principal (e.g. subscriber) or support details, etc.) may be dropped (i.e., not appropriately added/updated). Further, other data in the same repository that might need to be modified as a result of the change might not be modified appropriately. For example, an action such as creating a customer record in a customer database for a business such as a telecommunications service provider requires other updates or processes to be run for other systems, such as where a new customer must be added to the billing system in order to ensure that the customer will be billed for the service. The customer information must also be manually added to a support system so that the customer can receive necessary support, etc. It thus is not enough to simply update the information locally but all other necessary processes also must be executed in response to the update.

In the case of a service, when an update is to take place, it often is difficult to know where information is located, which information needed to be updated, as well as anything else that may need to be updated in order to maintain consistency of the entire system. This can significantly slow access, use, and changes to data such as subscription data. Many initiatives to offer such capabilities either fail or are extremely difficult to implement and/or integrate within a service provider's domain. Hence, there is value in offering a single API that allows the service to make queries without being made aware of specific details about the data, where the data is located, etc. In fact, many applications do not want to be made aware of the location of the data, how to keep the data consistent, what other OSS/BSS business flows to take into account, etc.

Hence, there is a need for improved methods and systems for implementing service level consolidated user information management.

BRIEF SUMMARY OF THE INVENTION

Embodiments of the invention provide systems and methods for implementing service level consolidated user information management. According to one embodiment, a method of implementing service level consolidated user information management can comprise receiving and/or intercepting, at a policy enforcer, a manipulation request of data. The selection of a policy to process/execute is a function of the manipulation request (i.e., viewing/accessing rights, changing/modifying rights, deletion rights, etc.) and the target data (i.e., which system/repository owns the data, is the data owned by one repository or multiple repositories or directly controlled by the main system). Such a determination may be straightforward or may require careful analysis of the manipulation request. For example, the analysis may include a check of affected data and whether to let the data pass through or be intercepted; a check of the data manipulation type and make a decision as to how to treat the manipulation request based on the type. These can be viewed as a sequence of conditions and actions within an overall protocol where these checks can be, for example, conditions followed by actions and/or workflows. This is further detailed in U.S. application Ser. No. 11/024,160, filed on Dec. 27, 2004, entitled POLICIES AS WORKFLOWS, and U.S. application Ser. No. 11/565,578, filed on Nov. 30, 2006, entitled ADDING FACTORED OUT FLOWS IN DECLARATIVE POLICY RULE SETS, which are incorporated by reference for any and all purposes. The method may further include analyzing the request to determine a data type associated with the manipulation request and, based on the data type, selecting a policy from a plurality of policies.

Additionally, an alternative aspect of the invention includes the situation for which when data is requested, in general, the location of the requested data is not known at the time the request is made. The requester is simply instructed as to the schema that the requester is able to access. However, in some cases, the requester may have additional information and may actually know the location of the data. In such cases, it is possible for the requester to be able to make a request through a common interface but also to specify which data is to be mapped to what file (i.e., what is the schema the requester expects to use and how the requester desires to see the data mapped from the original data that are aggregated and/or federated data).

Furthermore, the method may process (i.e., evaluation and/or enforce) the selected policy. The policy may be configured to direct the policy enforcer to allow the manipulation request to pass through to the associated destination data system to process the request, delegate processing of the manipulation request to at least one of a plurality of data systems, or process the manipulation request by the policy enforcer. In addition, the policy may be used to delegate the manipulation request to the owner(s) of the data, and initiate other possible workflows which are associated as processes across multiple systems/application (i.e., OSS/BSS, etc.).

In an alternative embodiment, when the data is requested in general, the requesting system will not know where the data is located. The system is simply aware of the schema which the system is able to access. However, in some cases the system may actually be aware of the data and where the data is located. In such cases, it is possible that the system is able to make a request through, for example, a common interface and also specify which data is to be mapped to what file (i.e., what is the schema the system expects to use and does the system want to see the schema mapped from the original data that is aggregated.

According to a further embodiment, a system for implementing service level consolidated user information management is described. The system may include a plurality of data systems, an aggregator/federator that aggregates/federates (virtually or otherwise) the data sources and provides a) managed identities and b) aggregation/federation of the data schemas. As such, a) and b) include data mapping that may be completed by an administrator at installation, at run time, or that may be exposed and controlled programmatically via interfaces. The system may further include a policy enforcer coupled with the plurality of data systems. The policy enforcer may be configured to receive/intercept any data manipulation request. The manipulation request may include an associated destination data system from the plurality of data systems. In an alternative embodiment, the storage location of the data is unknown to the policy enforcer and only the type of data from an aggregated view which the policy enforcer will desire to see. The mapping of the aggregation/federation then allows for a determination of the source of the data repository (or repositories) which are involved. The policy enforcer may further analyze the request to determine the content of the data, the location of the data, the construction of the request, etc. associated with the manipulation. Based on this information, a policy is selected from a plurality of policies and the selected policy is executed. The policy may be configured to direct the policy enforcer to allow the manipulation request to pass through to the associated destination data system to process the request, delegate processing of the manipulation request to at least one of the plurality of data systems, or process the manipulation request by the policy enforcer.

Furthermore, when generating a request to the consolidated profile which aggregates data, the schema may have been previously set up (e.g., via administration or configuration) or for a particular request may pass a description of the expected schema, mapping rules, aggregation rules, etc. (e.g., retrieve certain data from one address and other data from another address, and perform certain actions on the data, etc.). This may also be modeled as mapping policies (i.e., any combination of any condition and any action) to be used for the aggregation so that at the time of the request the required mappings are determined by the details passed in the request.

DETAILED DESCRIPTION OF THE INVENTION

Figure 1:
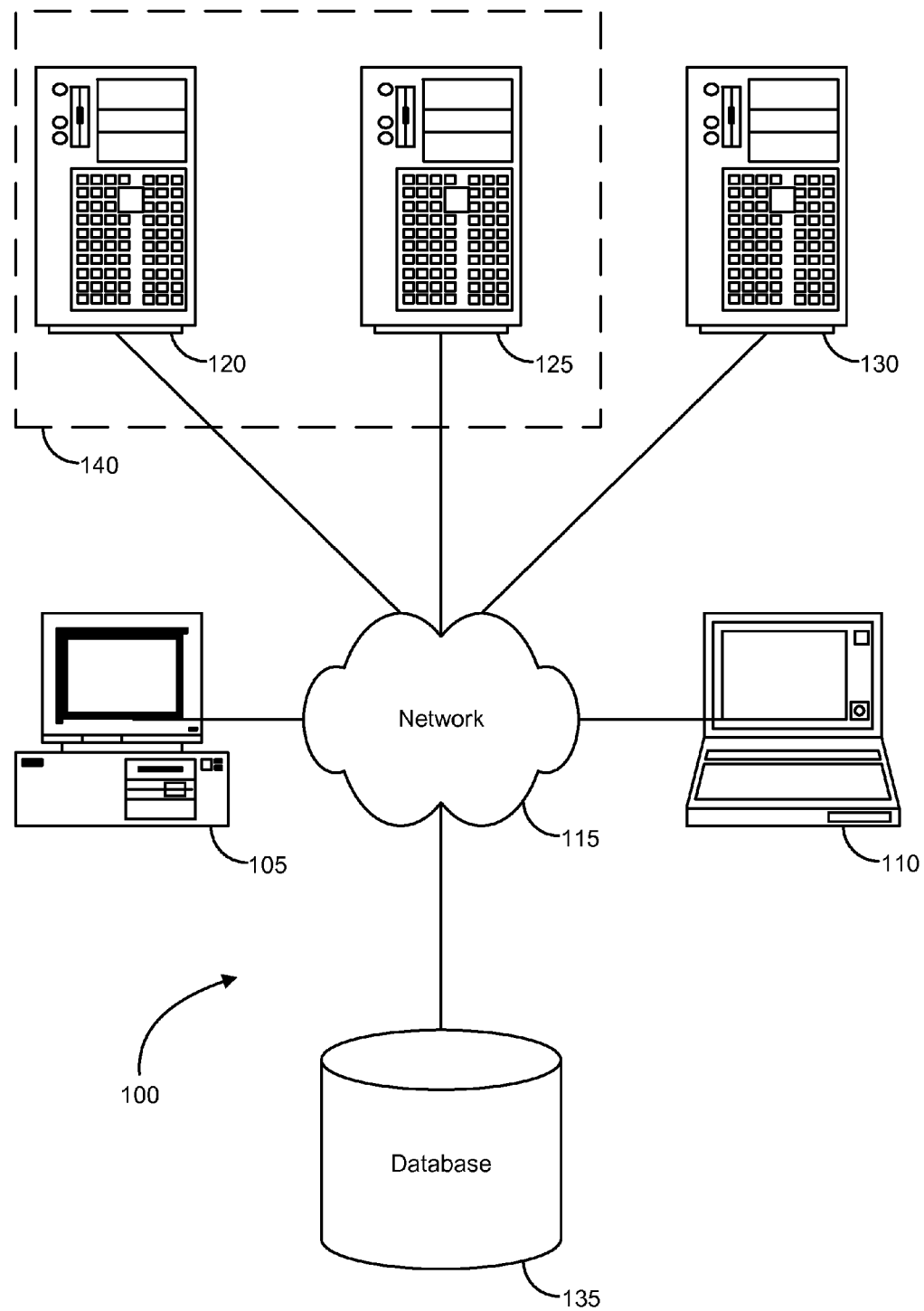
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Embodiments of the invention provide systems and methods for implementing service level consolidated user information management. More specifically, embodiments of the present invention provide for manipulating user data and data dependencies using a consolidated management and/or data access system. Alternatively, a common interface and schema and/or aggregation/federation of data across multiple sources with identify management (and federation) may be implemented to map data based on aggregated schema and identity management. Further aspects of the present invention include an enabler which exposes through, for example, a northbound interface the schema/data independently from a database with or without aggregation. Particularly, in addition to providing aggregated/federated views and aggregated/federated identities and a common interface, a policy enforcer may be configured to receive/intercept data manipulation requests. The policy enforcer may then, based on the request and the content of the data, the location of the data, and the construction of the request, etc. associated with the request, select an appropriate policy to apply. Furthermore, based on the selected policy, the policy enforcer may either process the request itself, delegate the processing of the request to another data system (e.g., OSS/BSS, a billing system, a subscription system, etc.), or allow the request to pass through to the destination data system (which typically may then own the data or the database that is targeted/aggregated may also trigger processes when data is changed or requests are made). Hence, the policy enforcer may act as an "orchestrator" which manages data manipulation requests in order to ensure that a single entity is directing the management of the data. As such, the data is always correctly synchronized and data dependencies are properly maintained. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft® Corp.'s Windows® and/or Apple Corp.'s Macintosh® operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network 115 can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network ("WAN"); a virtual network, including without limitation, a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO, etc.

The system 100 may also include one or more server computers 120, 125, 130 which can be general purpose computers and/or specialized server computers (including, merely by way of example, PC servers, UNIX servers, mid-range servers, mainframe computers rack-mounted servers, etc.), personal digital assistants (PDAs), and other such computing devices. One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server 140 can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer 105, 110 and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 120, 125, 130. Alternatively, it may be remote from any or all of the computers 105, 110, 120, 125, 130, and/or in communication (e.g., via the network 115) with one or more of these. In a particular set of embodiments, the database 135 may reside in a storage-area network ("SAN") familiar to those skilled in the art. Similarly, any necessary files for performing the functions attributed to the computers 105, 110, 120, 125, 130 may be stored locally on the respective computer and/or remotely, as appropriate. In one set of embodiments, the database 135 may be a relational database, such as Oracle® 10g, that is adapted to store, update, and retrieve data in response to SQL-formatted commands.

Figure 2:
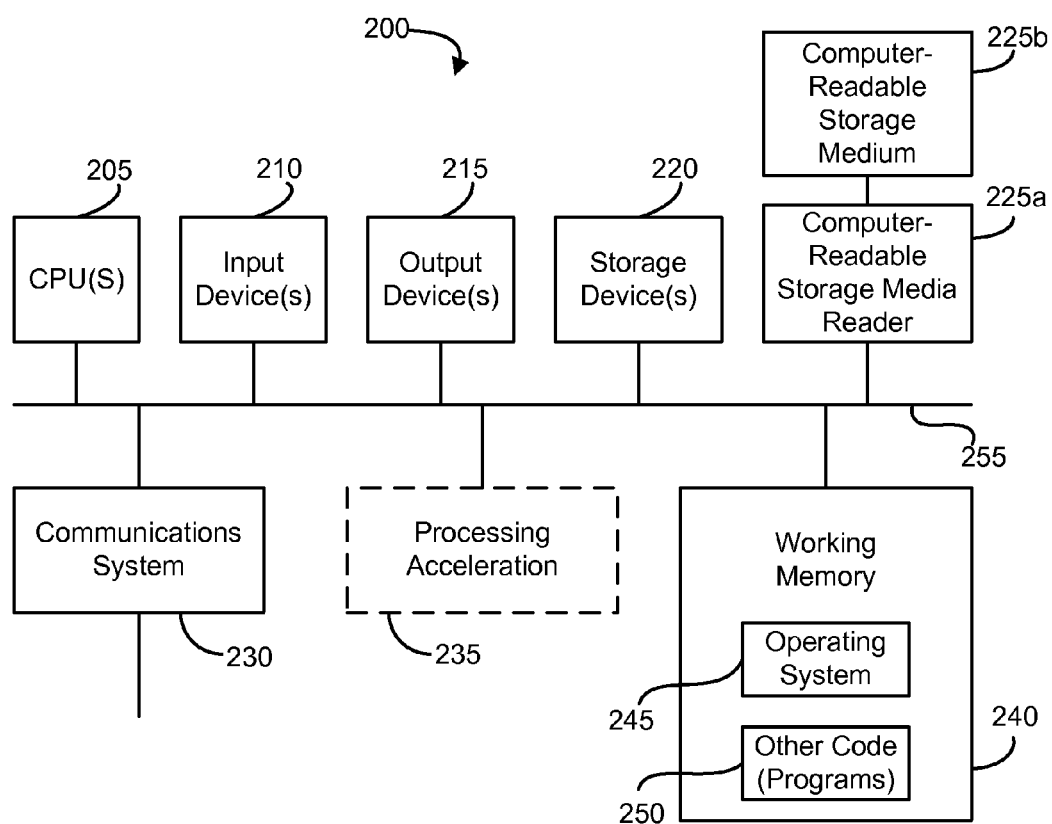
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 115 (FIG. 1) and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3A:
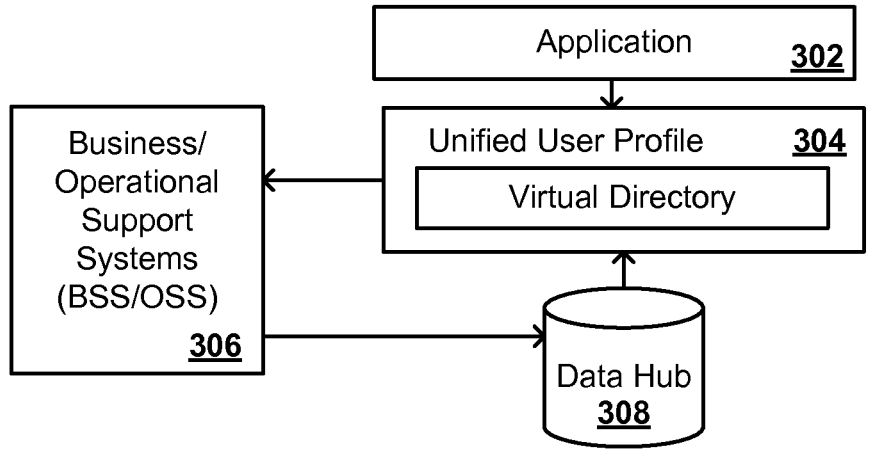
FIGS. 3(a) and 3(b) illustrate exemplary flows for an update request from an application in accordance with one embodiment of the present invention.
Figure 3B:
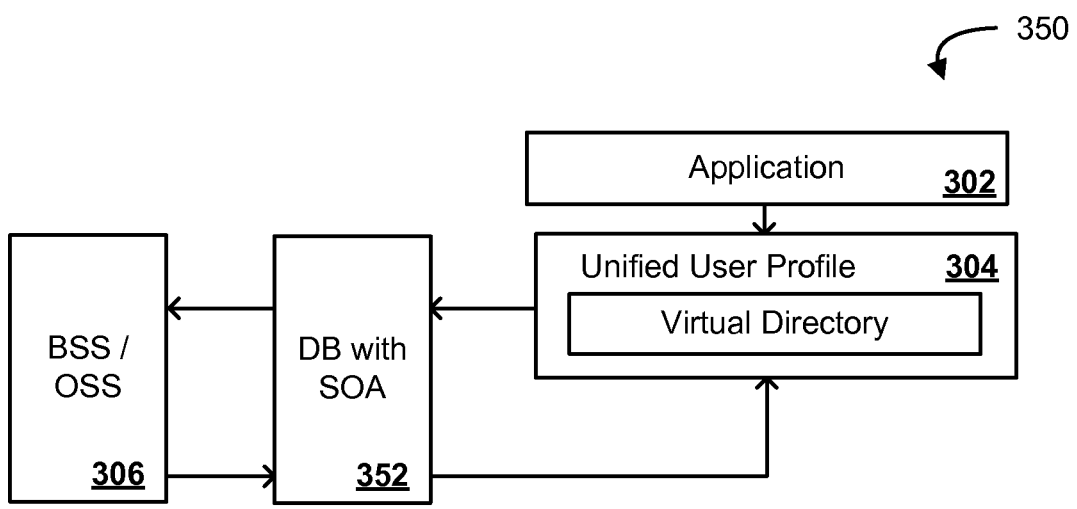

The present invention relates to the systems and methods described in U.S. patent Ser. No. 12/019,299, filed on Jan. 24, 2008, entitled "SERVICE-ORIENTED ARCHITECTURE (SOA) MANAGEMENT OF DATA REPOSITORY,", which is hereby incorporated herein by reference, which is summarized in FIGS. 3(*a*) and 3(*b*). FIG. 3(*a*) describes an application 302 which can issue a command to create a new account in a unified user profile (UUP) 304. Instead of updating the appropriate repository, however, the UUP component 304 causes a workflow to be launched (may be a single action such as a data manipulation action if needed) which may consist of one or more business processes which interact with the OSS/BSS 306 to initiate an update to the OSS/BSS-owned repository (or repositories). Once the OSS/BSS repository is updated, the UUP continues such that the resulting updates in the OSS/BSS repository are reflected in the data hub 308 and UUP 304 (or any other repository that may be visible/aggregated by the UUP). The UUP is a virtual view of other data repositories such that, when data is updated, the view by default is also updated, alternatively the data is synchronized/replicated from the repository. In such a situation, automation of the process between OSS/BSS repositories and the UUP occurs. However, if this is not well automated, then the workflows may be responsible for triggering the replications in order to make sure the changes are correctly reflected in the UUP. The end result seen by the application is the same, but any corresponding actions are taken care of by the workflow. FIG. 3(*b*) illustrates another exemplary flow 350 wherein the UUP 304 component updates the data in a database component with SOA data management capabilities 352, wherein the database component itself is able to trigger (possibly before the update or as a result of an update) a workflow that creates a business process which interacts with the OSS/BSS 306.

It is always possible that an update operation might fail. For example, a requester may wish to create an account for a user and, if the system simply used SQL to create the appropriate records, then the account would be created. When using a workflow, however, it is possible that the customer information first would be directed to a financial system wherein the customer might fail a credit check, for example, which would cause the customer to not qualify for the selected service. In such a case, the account will not be created in the database. In one embodiment, a failure is expected to result in the UUP 304 returning an error message to the requestor through the requestor's interface, just as a success answer can also be similarly returned if all requests are completed as expected. Accordingly, these actions could then result in a remedial flow or flows which revert the previous actions.

In one example, the creation of an account triggers updates in rating and billing information for the account, as well as a list of support data, etc. There can also be an updating of data not seen in the SDP and typically not known by the applications. There may be assets that are not aggregated in the UUP 304, which can be a valid choice for a particular operator. The new service may result in the shipping of a new phone, modem, or set-top box, for example. The service can also be reflected in another repository, which would not have been updated if the change had been done straight to the repository without the flows. In another example, a user phone or modem must be delivered, provisioned and/or service activated when the subscriber adds a subscription, which is the result of a flow that would not have occurred if the data were simply updated directly.

The service level user profile can rely on the UUP 304 to provide an identity managed virtual view of all data about principals or customers encountered in a service provider (SP) domain and used in the service layer. A SDP is an example of a platform for the service layer (i.e., for development, deployment, execution, and management), thus the User profile is expected to be used to access all of the information needed in the service layer (but not all encountered in the service layer). Hence, because applications should not be restricted as to actions they can perform, all information that a SP has about users, subscribers, principals, etc. is made available. This information can include, for example, credentials, BSS/Subscriptions (including the data hub and subscription management), service/application specific data, security data, preferences and usage patterns, network information (e.g., HSS), dynamic information (e.g., presence and location information), OMA XDM profiles, and OMA GSSM information when available, for subscribers, users, customers, third parties, or any other appropriate parties. In other words, any appropriate principals.

In a further embodiment, UUP 304 may be used, for example, to abstract a database with an interface, to connect to the database via an adapter, to map a schema, to manage an identity, and to aggregate across a number of repositories. UUP 304 may further be used to expose profile/versions of profiles in a service layer and to use user profiles based on the service layer. The profiles may be optimized with various alternatives. Furthermore, policies may control data manipulation and affect workflow before, during, and after data change requests are received, passed to the repositories, etc.

The data management of the virtual directory or unified repository can be controlled (if necessary and depending on setup, policies, the data, and the request) so that an operation on some or all of the data is not performed as a simple data management operation. However, instead it converted into at least one request that is passed to another system(s) that will act on the request in ways that should ultimately similarly affect the data, but may affect other data or the context for the data.

The UUP 304 utilizes the managed/federated identity to provide an identity managed and federated virtual view of all data about principals or customers encountered in a service provider domain and used in the service layer. This information can include in association with the same identity aggregated data that were associated to different identities (possibly in different identity systems) from where the data is located, for example, credentials, BSS/Subscriptions (including a data hub and subscription management), service/application specific data, security data, preferences and usage patterns, network information (e.g., HSS), dynamic information (e.g., presence and location information), OMA XDM profiles, and OMA GSSM information (when available) for subscribers, users, customers, third parties, and/or any other appropriate parties.

The data management of a virtual directory (i.e., one way to implement the aggregated view aspect of the UUP 304) can be controlled so that an operation on some or all of the data is not performed as a simple data management operation, but instead is converted into at least one request that is passed to another system(s) that will act on the request in ways that should ultimately similarly affect the data, but may affect other data or the context for the data. Information about principals or customers encountered in the SDP can include, for example, credentials, BSS/Subscriptions (including the data hub and subscription management), service specific data, network information (e.g., HSS), dynamic information (e.g., presence and location information), OMA XDM profiles, and OMA GSSM information when available, for subscribers, users, customers, third parties, or any other appropriate parties. Alternatively, this may not be accomplished by the UUP 304 but instead delegated to a target repository which can then be seen as a UUP 304 to some extent.

Additionally, UUP 304 may provide various applications in the SDP with concurrent network access to various directories and repositories/database management systems across the domain. Concurrent access can be provided via various methods, such as by using Identity Management (IdM), Lightweight Directory Access Protocol (LDAP v3), Directory Services Markup Language (DSML v2), and Diameter Sh and Cx. The UUP 304 can include a highly extensible user profile with support for application-specific dynamic user views and can provide support for Home Subscriber Server (HSS) and Subscription Location Function (SLF) functionality. The user profile data can be managed using any appropriate data management system, such as the Oracle® RDBMS server available from Oracle Corporation of Redwood Shores, Calif.

Figure 4:
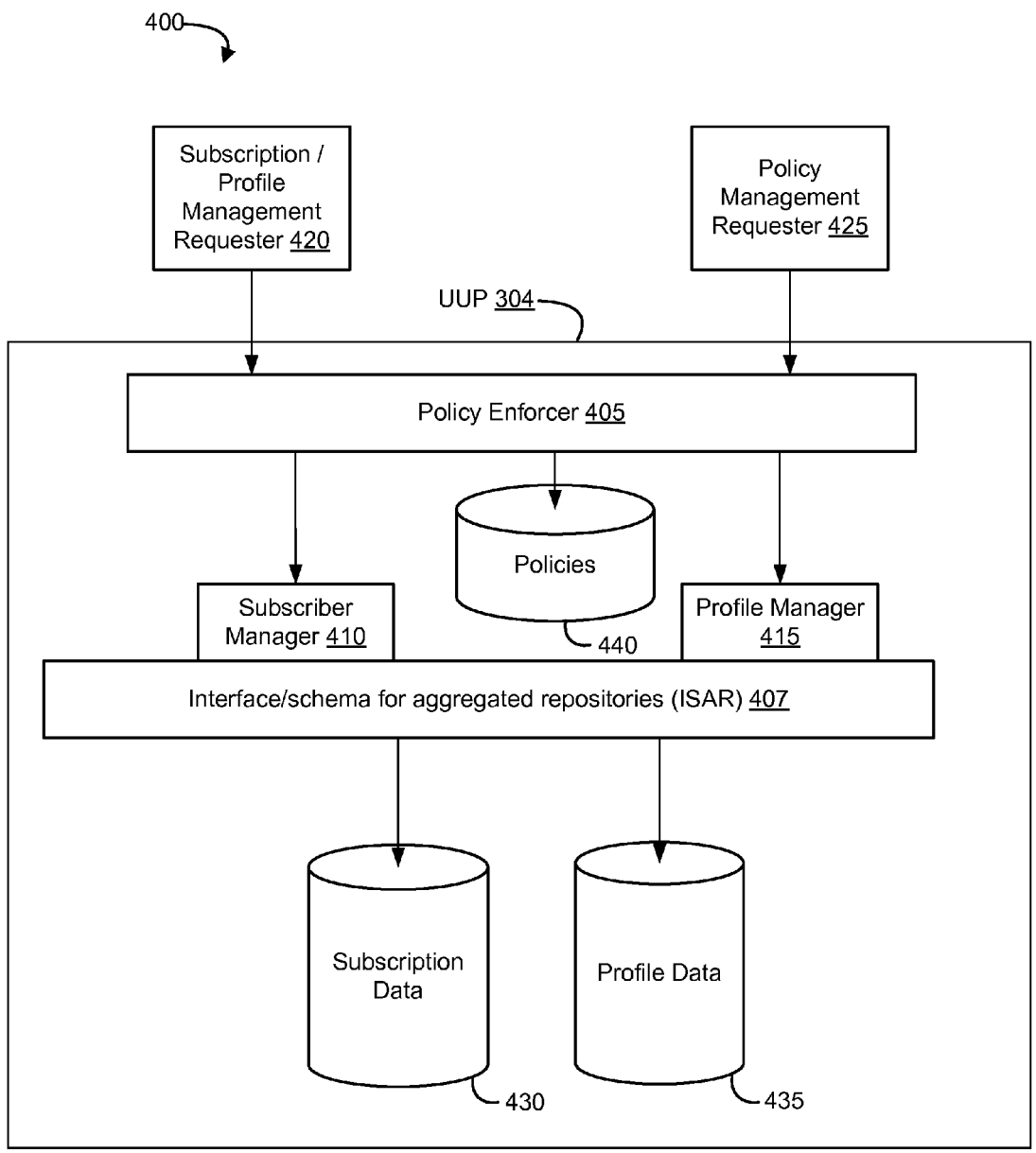
FIG. 4 is a block diagram illustrating, at a high-level, functional components of a system for implementing service level consolidated user information management according to one embodiment of the present invention.

Turning now to FIG. 4 which is a block diagram illustrating, at a high-level, functional components of a system for implementing service level consolidated user information management according to one embodiment of the present invention. In this example, the system 400 includes a policy enforcer 405. In one embodiment, policy enforcer 405 may be configured to intercept manipulation requests (i.e., adding a new field, removing an entry, changing a value, etc.) of data from a subscription/profile management requester 420 or a policy management requester 425 via UUP 304.

Alternatively, system 400 may include an additional policy enforcer located outside of UUP 304. In one embodiment, the additional policy enforcer may be configured to apply for service provider policies on how capabilities are exposed to an application (e.g., security, changing values, logging, etc.).

Policy enforcer 405 may act as an orchestrator (or central processing hub) which routes all data manipulation requests received from requesting systems (i.e., subscription/profile management requester 420, policy management requester 425, etc.). In one embodiment, policy enforcer 405 is able to ensure that each manipulation request is handled by an appropriate data system (e.g., OSS, BSS, etc.), that proper data synchronization and data dependencies are maintained, and that data manipulation management is controlled in a consolidated manner by a single entity.

In one embodiment, policy enforcer 405 may be coupled with a policies database 440. As used herein, the term policy may refer to a combination of one or more conditions and a set of one or more associated actions to be performed upon the condition(s) being satisfied. That is, the policies can define conditions to be met and corresponding actions to be taken when receiving a publication of a presence attribute, notifying subscribers/listeners, responding to queries, etc. For example, the policies can define which subscribers or listeners are authorized to receive a notification or access a profile or attribute. Additionally or alternatively, the policies can define conditions and actions for use by the service to determine what information is shown to whom, how is the information transformed, under what conditions, etc. Other possible policies, i.e., any combination of any condition and any action, are contemplated and considered to be within the scope of the present invention. According to one embodiment, application of policies and handling of events can be performed as described in U.S. patent application Ser. No. 11/424,451 filed Jun. 15, 2006 by Maes and entitled "PAST PRESENCE HINTS", the entire disclosure of which is incorporated herein by reference for all purposes. That is, application of policies and handling of events can be based on current events and/or information as well as past events and/or information.

Upon receiving a manipulation request, policy enforcer 405 may analyze the request to determine the appropriate policy to apply to the request. As described above, the policy may provide policy enforcer 405 with instructions on how to manage the various requests. For example, some requests may deal with manipulating data with access which is restricted only to the owner of the data. As such, based on the appropriate policy instructions, policy enforcer 405 would need to instruct the data's owner to perform the data manipulation. Conversely, certain data may be able to be accessed by multiple data systems (which may or may not own the data).

In this situation, the policy may instruct policy enforcer 405 to delegate execution of the request or to execute the request itself. Hence, policy enforcer 405, based on the selected policy, can effectively route requests to the appropriate data systems in order to effectively process the requests.

In one embodiment, the data systems in which the request may be routed are interfaces of the UUP 304 which expose subscriber manager 410 or profile manager 415 functions and/or capabilities. In an alternative embodiment, subscriber manager 410 and profile manager 415 are interfaces (or enablers) which are configured to provide dedicated functions. One difference between subscriber manager 410 and profile manager 415 and UUP 304 is that subscriber manager 410 allows access to subscription information with subscription management operations such as, for example, being able to subscribe to a service, is a user subscribed, what service is the user subscribed to, what are the conditions for using the subscription, what are the rates, etc. Similarly, profile manager 415 allows access to user profile information such as the profile type, information regarding the user's identity, the user preferences for a service, the user's history, etc. Hence, subscriber manager 410 and profile manager 415 are provided with higher level primitives than simply the basic "data access or manipulations" that are exposed more or less directly through the UUP 304 interfaces. Accordingly, subscriber manager 410 and profile manager 415 can be built on top of UUP 304 as a higher-level construct that consists of one or multiple manipulations of data through UUP 304.

Subscriber manager 410 may "own" the data contained in subscription data database 430, and profile manager 415 may "own" the data contained in profile data database 435. In other words, any requests may pass directly to subscriber manager 410 and profile manager 415; alternatively, UUP 304 may also "own" the data. Accordingly, merely by way of example, subscriber management requester 420 initiates a data manipulation request to change a customer's contact information. The contact information may be stored in subscription data database 430 and the contact information may be accessed by either policy enforcer 405 or subscriber manager 410. In one embodiment, policy enforcer 405 may check a requester to determine if the requester is authorized to access the data within the request. Examples of policy enforcer 405 may be found in U.S. application Ser. No. 10/855,999, filed on May 28, 2004, entitled METHOD AND APPARATUS FOR SUPPORTING SERVICE ENABLERS VIA SERVICE REQUEST HANDHOLDING, U.S. application Ser. No. 10/856,588, filed on May 28, 2004, entitled METHOD AND APPARATUS FOR SUPPORTING SERVICE ENABLERS VIA SERVICE REQUEST COMPOSITION, and U.S. application Ser. No. 11/357,653, filed on Feb. 16, 2006, entitled FACTORIZATION OF CONCERNS TO BUILD A SDP (SERVICE DELIVERY PLATFORM), which are incorporated by reference in their entirety for any and all purposes. As such, based on the policy which policy enforcer 405 employs, policy enforcer 405 may allow the request to execute the subscription management or profile management, or policy enforcer 405 will allow the request to pass to the repository (i.e., UUP 304). The policies are used by policy enforcer 405 to decide which requests policy enforcer 405 executes/allows to pass through after intercepting the request, as well as executing, enforcing, processing, etc. of the policies.

Alternatively, if, for example, the customer's contract information is restricted to only be accessed by the owner of the data (i.e., subscriber manager 410), then policy enforcer 405 would instruct subscriber manager 410 to execute the request. Additionally, if the customer's contract information included a data dependency with data stored in, for example, profile data database 435 (e.g., the change to the customer's contact information caused a change to the customer's profile as well), then policy enforcer 405 would need to execute a subsequent data manipulation request to change the dependent customer profile. Similarly, based on the policy employed, policy enforcer 405 would either directly execute the change to the profile data or may instruct profile manager 415 to perform the change.

In a further embodiment, policy manager 405 may provide an interface for changing existing policies as well as adding new policies (i.e., to manage policies 440). For example, the interface may access policy database 440 and present policy management requester 425 with details about the various policies. As such, policy management requester 425 may request changes to the policies or may provide information about a new policy. For example, a policy's conditions and/or associated actions may be changed or removed, as well as the data types and/or request types associated with each of the polices.

Furthermore, policy enforcer 405 may provide a unified interface for all data contained in, for example, databases 430 and 435. In one embodiment, the unified interface may be a service level interface. In a further embodiment, the interface may include "Northbound" interfaces (e.g., Java™, SOAP/HTTP, LDAP, Diameter (Sh/Dh), Diameter (Cx/Dx), OMA GSSM, XCAP (OMA XDM profile enabler)) and "Southbound" protocols (e.g., LDAP, XCAP, JDBC, Diameter (Sh/Dh), Diameter (Cx/Dx), HSS, SLS, MAP (HLR) and FW to adapt to dynamic resources such as enablers, NW resources, and applications) as well as any customer repositories and applications that expose/control the interface. The source can include various IMS profiles (schemas (TS 23.008) and schema extensibility), TMF SID/customer data model support (for both northbound and southbound), subscriber management features (e.g. as applications) including integration with, for example, OSS/BSS 306 (FIGS. 3(a) and 3(b)). These can then be mapped adequately using either information passed with the request (that indicates how to map, what identity management/federation to use, and how to map any attributes); in general, the information is pre-defined by, for example, a vendor at setup or configured by an administration task, interface, console, etc.

In an alternative embodiment, aspects of the present invention may be used to provide a common interface to any data repository. For example, in the case of data aggregation, the data is not actually aggregated, but instead each individual database is separately maintained and the common interface exposes the individual database in one common interface. Accordingly, the present invention is configured similar to an enabler which abstracts repository details with possible identity, management, federation, mappings, etc.

Figure 5:
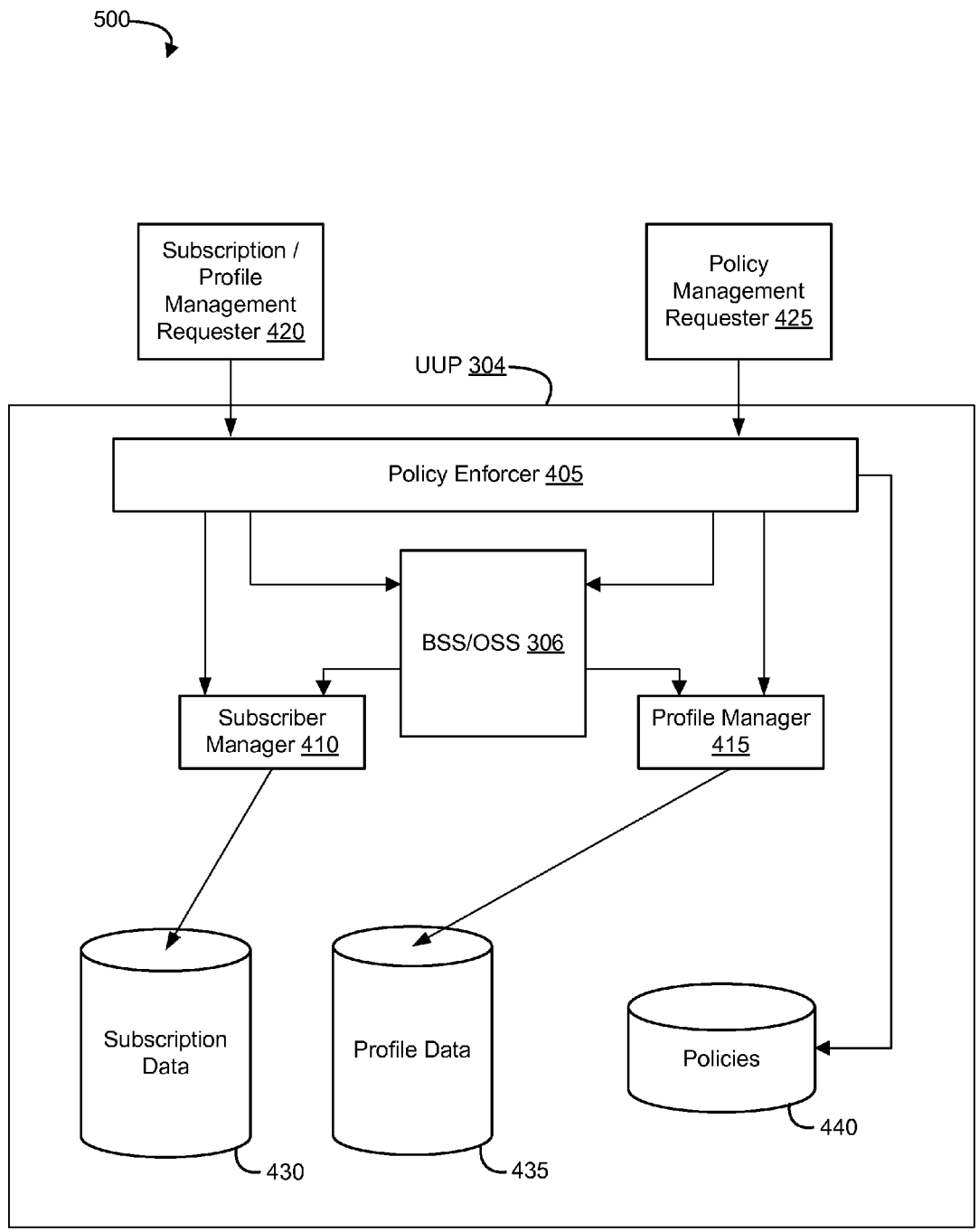
FIG. 5 is a block diagram illustrating, at a high-level, functional components of a system for implementing service level consolidated user information management according to a further embodiment of the present invention.

Referring now to FIG. 5 which is a block diagram further illustrating, at a high-level, functional components of a system for implementing service level consolidated user information management according to another embodiment of the present invention. In this example, the system 500 includes the integration of OSS/BSS 306 (or generally the data owner) to system 400. As can be seen in system 500, policy enforcer 405 may interact directly with either subscriber manager 410 or profile manager 415, or alternatively may indirectly interact with subscriber manager 410 or profile manager 415 through OSS/BSS 306. Accordingly, the request goes to the one of the management interfaces and accesses the data that arrives for subscriber manager 410, UUP 304, or profile manager 415, if policy enforcer 405 allowed the request to pass through. The request is sent (or the request triggers flows to data owners (e.g. OSS, BSS)). Both situations can coexist (i.e., some requests change the data and some requests allow the repositories themselves to behave the same and trigger flows). When the data owner determines some data changes should take place, the data owner may directly make the change to the repositories or the owners may also use UUP 304 or higher level APIs to execute the changes.

In one embodiment, policy enforcer 405 may delegate execution of the manipulation request to OSS/BSS 306. Subsequently, OSS/BSS 306 may then instruct subscriber manager 410 or profile manager 415 to perform the changes associated with the manipulation request. In one embodiment, policy enforcer 405 may delegate to OSS/BSS 306, because OSS/BSS 306 is the data owner which should perform the changes that results in policy enforcer 405 delegating to OSS/BSS 306 based on the policies indicating as such. Alternatively, OSS/BSS 306 may be aware of data dependencies and other data correlations of which UUP 304 is not aware. Furthermore, OSS/BSS 306 may also be better equipped to handle the particular data manipulation request. Nonetheless, whatever the reason for delegating execution of the request to OSS/BSS 306, policy enforcer 405 is configured to manage all of the incoming requests and appropriately route the requests.

Figure 6:
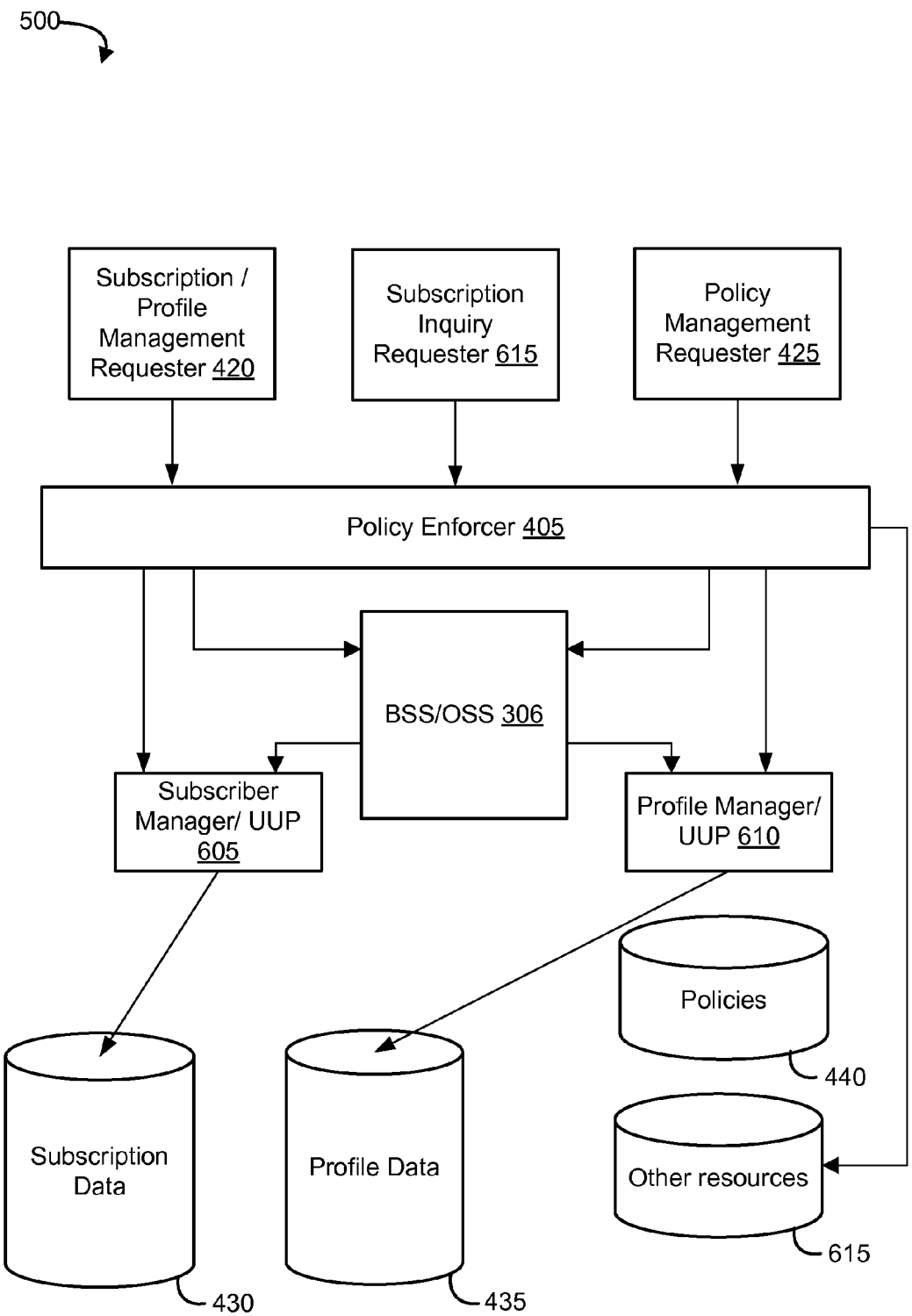
FIG. 6 is a block diagram illustrating, at a high-level, functional components of a system for implementing service level consolidated user information management according to a further embodiment of the present invention.

Turning now to FIG. 6 which is a block diagram further illustrating, at a high-level, functional components of a system 500 (FIG. 5) for implementing service level consolidated user information management according to another embodiment of the present invention. In this example, UUP 304 (FIGS. 3(a) and 3(b)) is removed and aggregated into subscriber manager/UUP 605 and profile manager/UUP 610. As such, subscriber manager/UUP 605 and profile manager/UUP 610 control data flow to subscription data 430 and profile data 435, respectively. Policy enforcer 405 passes data to subscription data 430 and profile data 435 repositories, to the repositories' higher level abstractions, or to the data owner (e.g., OSS/BSS 306). FIG. 6 further includes other resources 615 which may be used for delegation and/or policy enforcement. In a further embodiment, subscription inquiry requester 615 is configured to process subscription inqueries.

Figure 7:
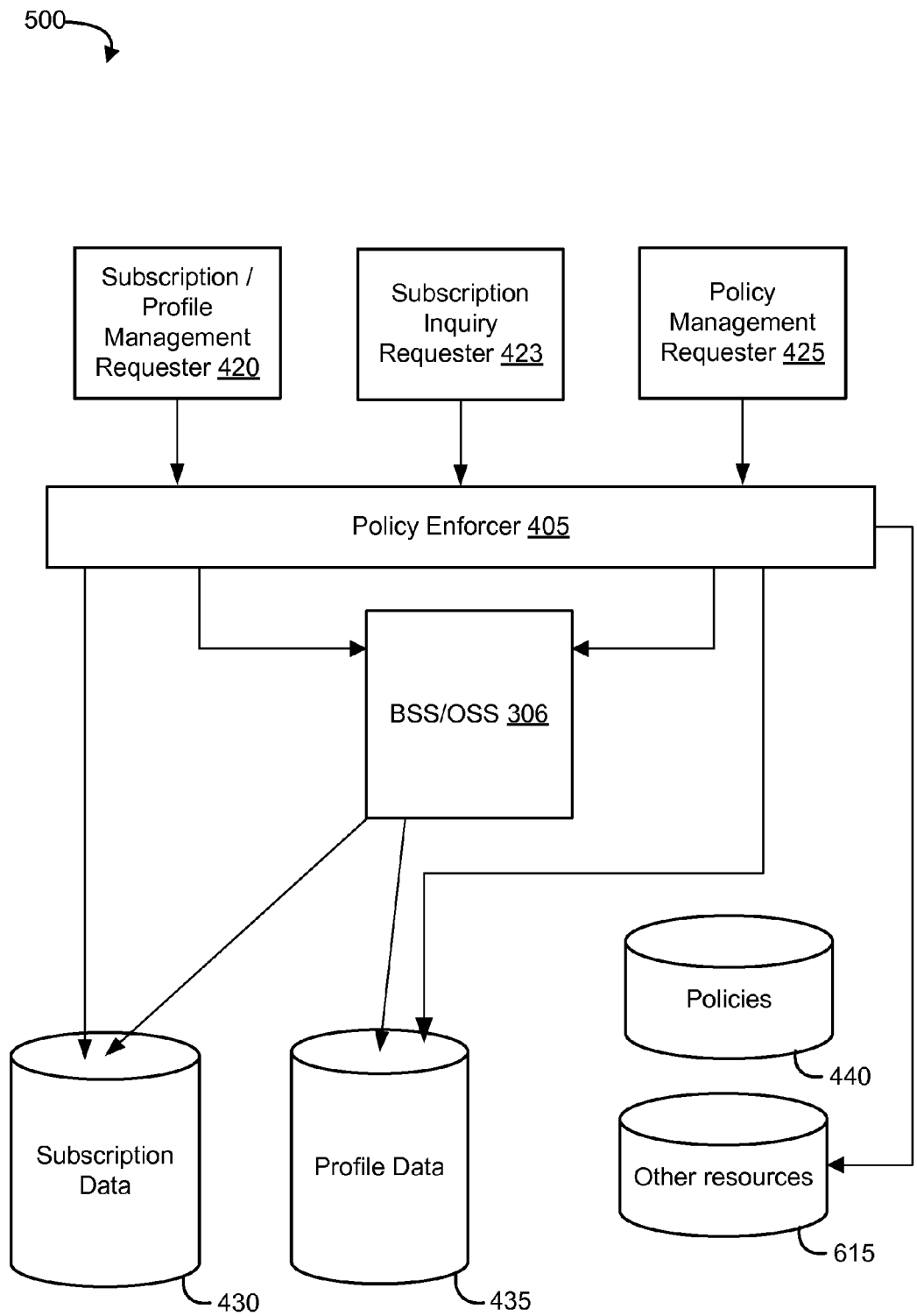
FIG. 7 is a block diagram illustrating, at a high-level, functional components of a system for implementing service level consolidated user information management according to a further embodiment of the present invention.

Turning now to FIG. 7 which is a block diagram further illustrating, at a high-level, functional components of a system 500 (FIG. 5) for implementing service level consolidated user information management according to another embodiment of the present invention. FIG. 7 removes subscriber manager/UUP 605 and profile manager/UUP 610, as shown in FIG. 6, in order to provide OSS/BSS 306 with direct access to subscription data 430 and profile data 345 repositories.

Figure 8:
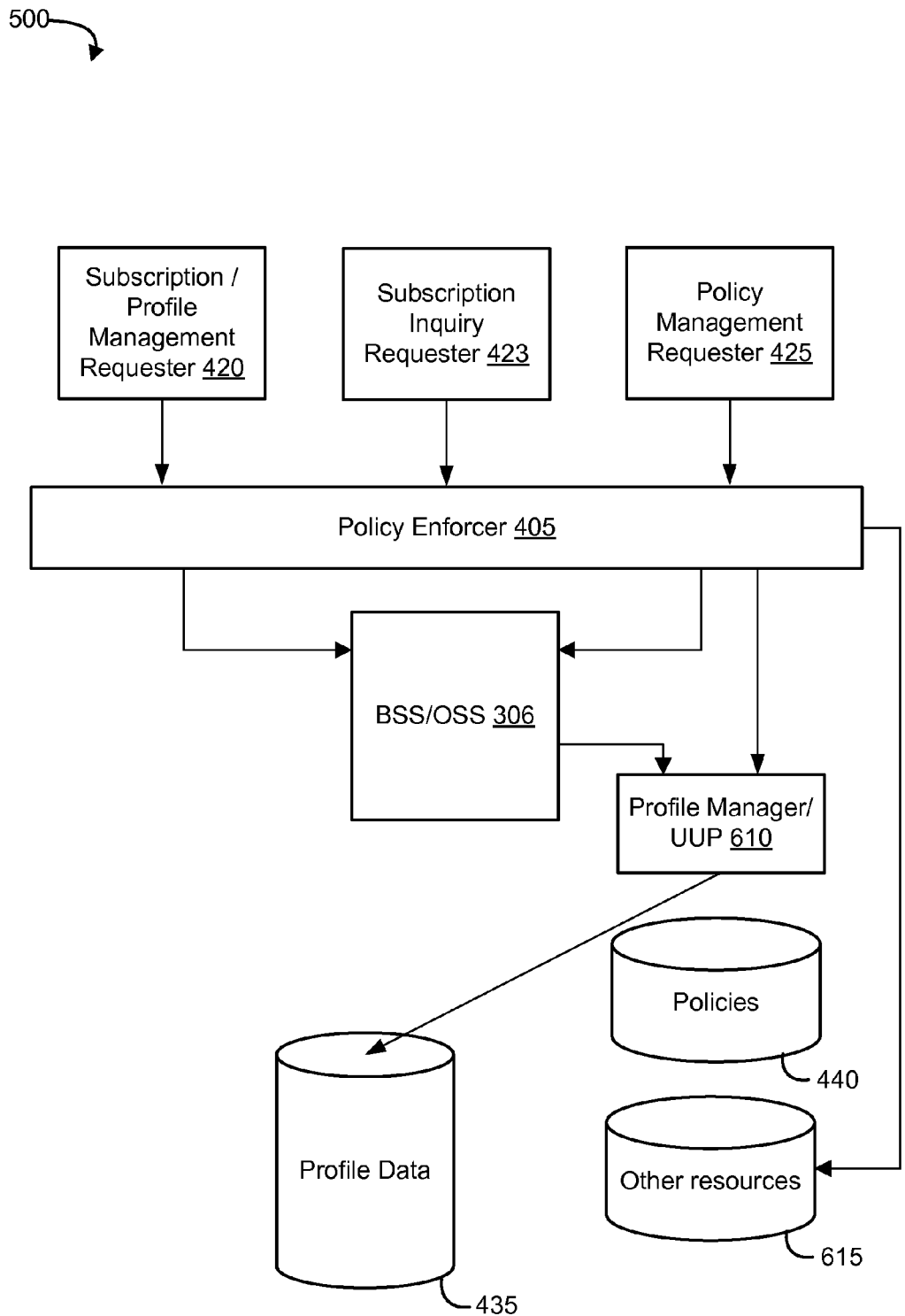
FIG. 8 is a block diagram illustrating, at a high-level, functional components of a system for implementing service level consolidated user information management according to a further embodiment of the present invention.
Figure 9:
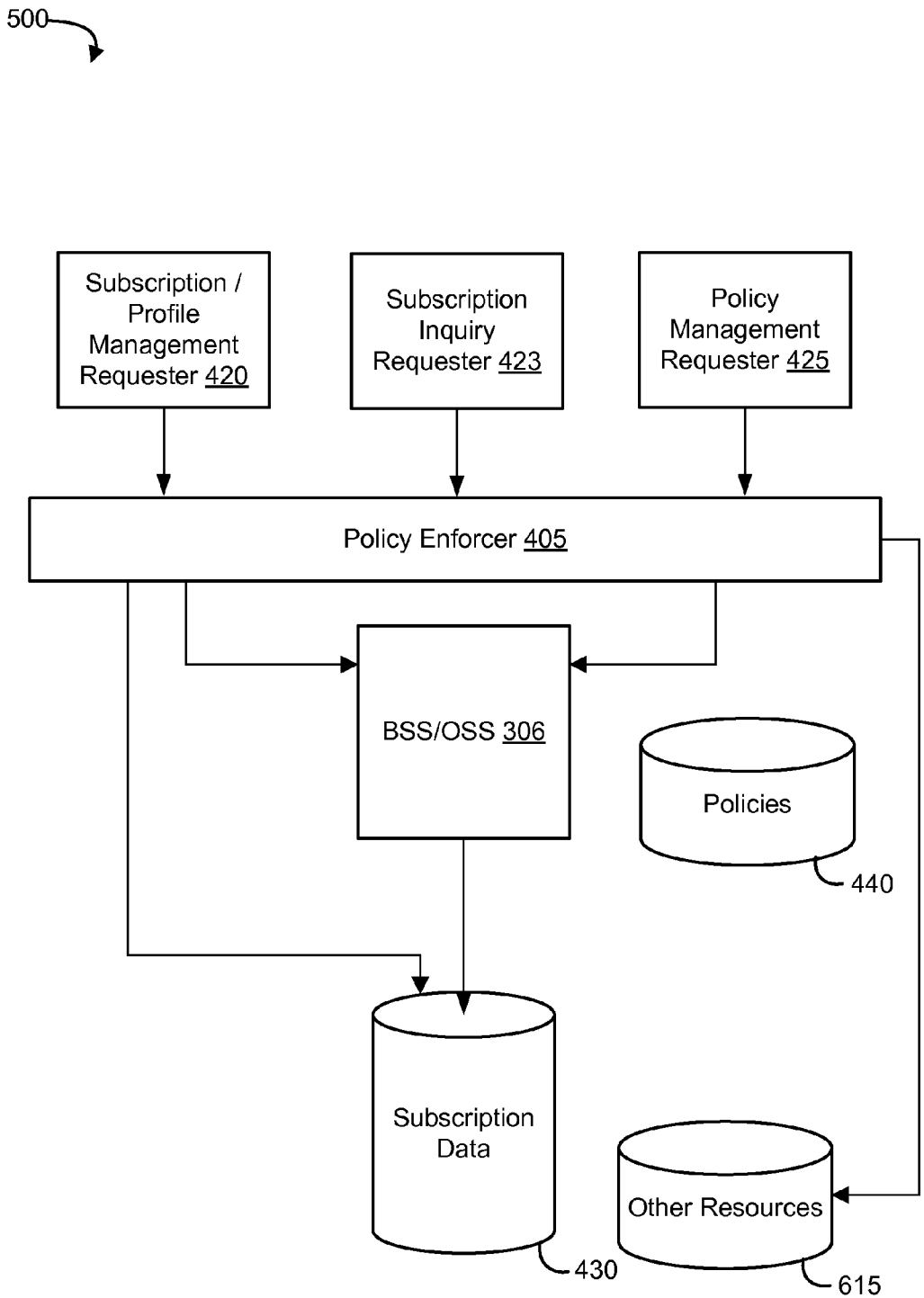
FIG. 9 is a block diagram illustrating, at a high-level, functional components of a system for implementing service level consolidated user information management according to a further embodiment of the present invention.
Figure 10:
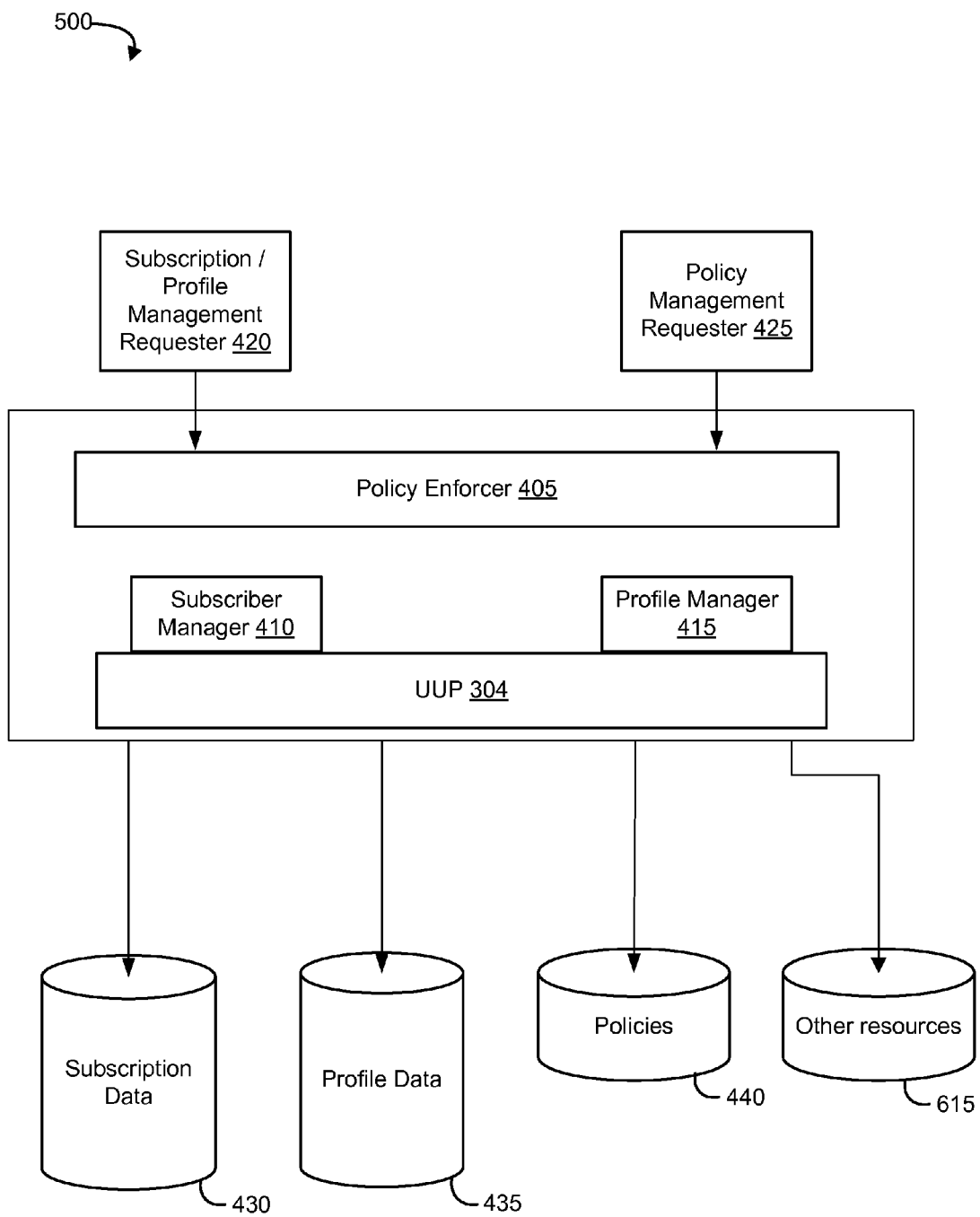
FIG. 10 is a block diagram illustrating, at a high-level, functional components of a system for implementing service level consolidated user information management according to a further embodiment of the present invention.
Figure 11:
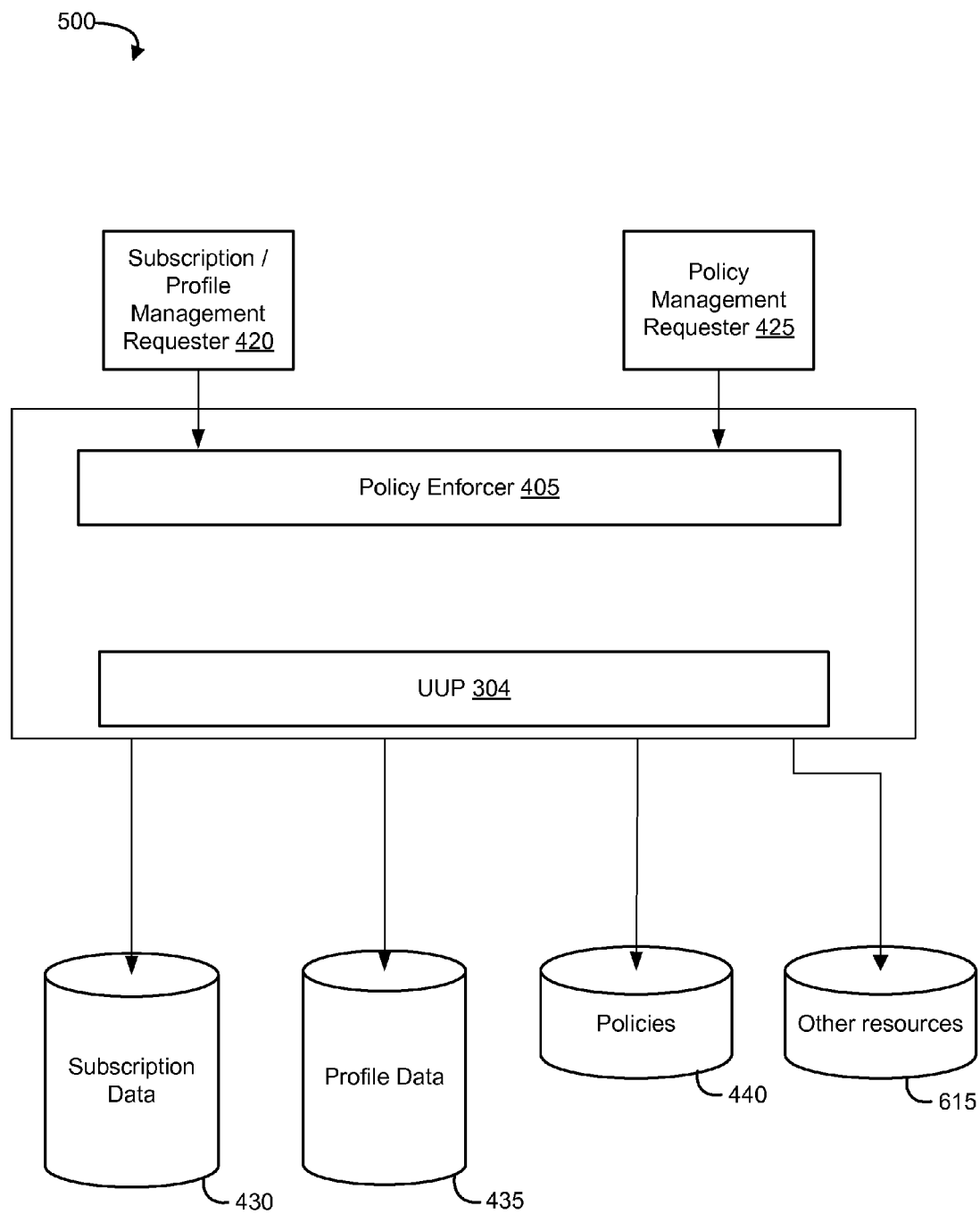
FIG. 11 is a block diagram illustrating, at a high-level, functional components of a system for implementing service level consolidated user information management according to a further embodiment of the present invention.
Figure 12:
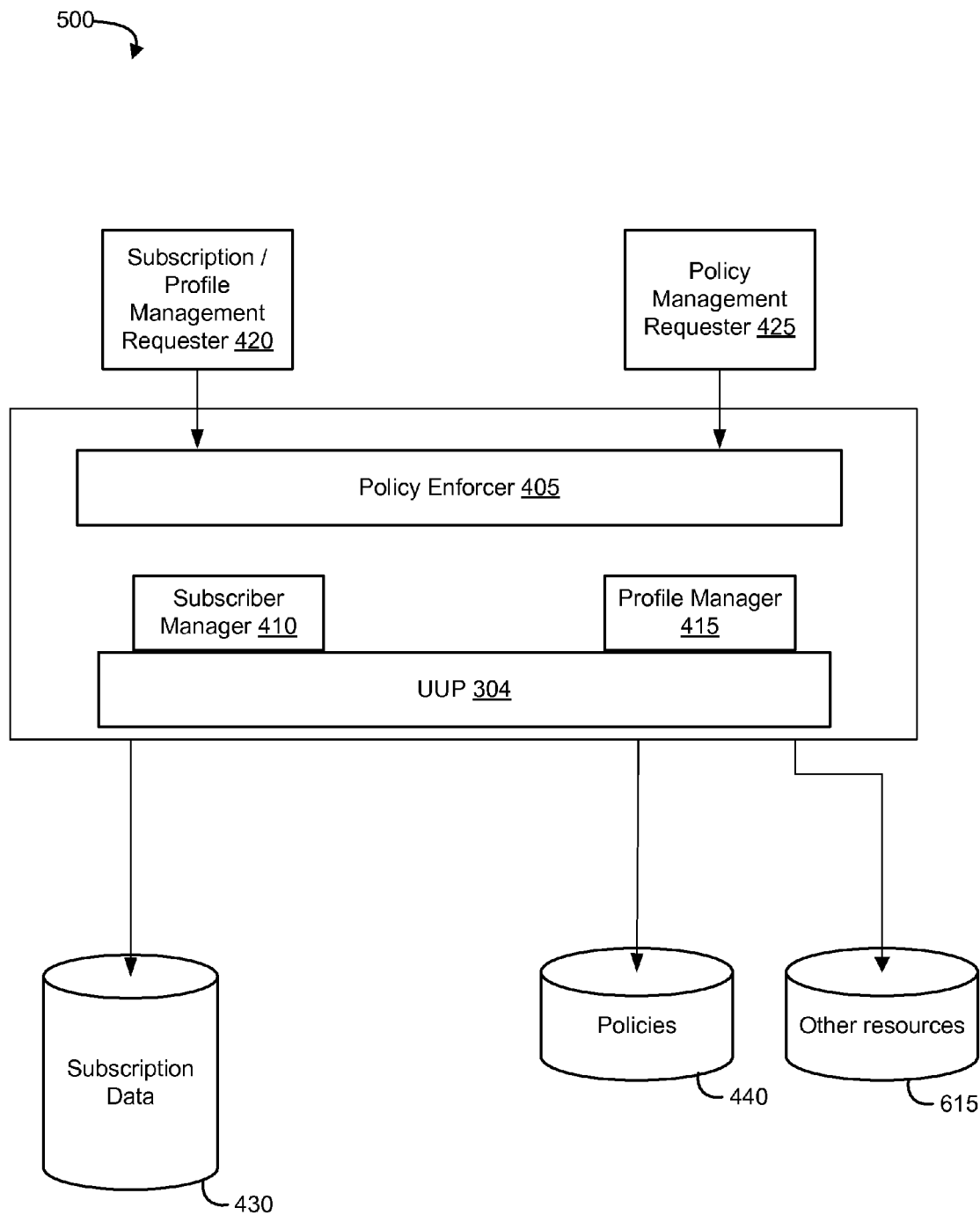
FIG. 12 is a block diagram illustrating, at a high-level, functional components of a system for implementing service level consolidated user information management according to a further embodiment of the present invention.
Figure 13:
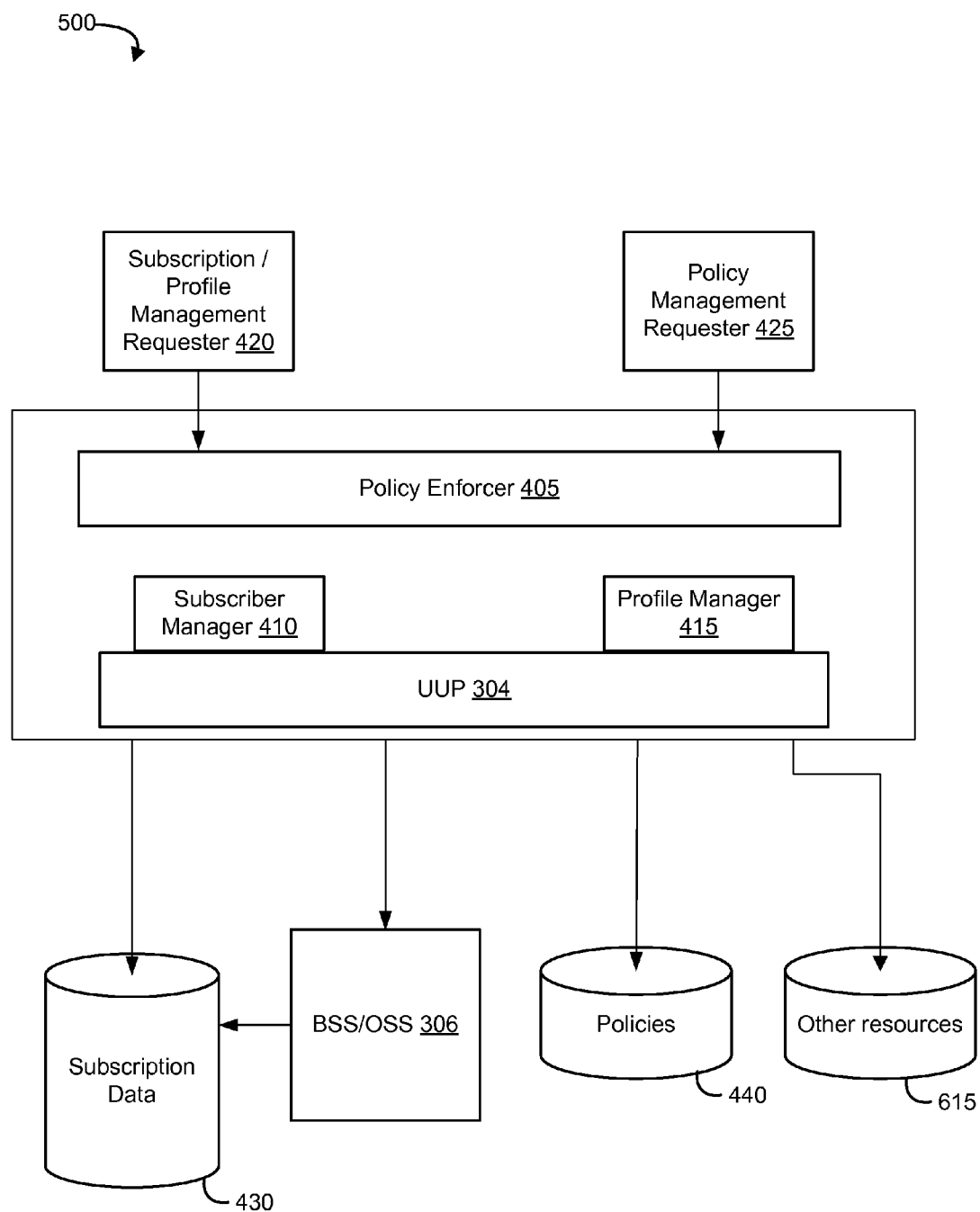
FIG. 13 is a block diagram illustrating, at a high-level, functional components of a system for implementing service level consolidated user information management according to a further embodiment of the present invention.

Turning now to FIGS. 8 and 9 which are block diagrams further illustrating, at a high-level, functional components of a system 500 (FIG. 5) for implementing service level consolidated user information management according to another embodiment of the present invention. FIGS. 8 and 9 remove subscription data 430 and profile data 435, respectively. In one embodiment, profile data 435 and subscription data 430 may be the same or similar and, as such, removing one or the other does not affect the functionality of system 500.

Turning now to FIGS. 10, 11, 12, and 13 which are block diagrams further illustrating, at a high-level, functional components of a system 500 (FIG. 5) for implementing service level consolidated user information management according to another embodiment of the present invention. FIGS. 10, 11, 12, and 13 adds UUP 304 to abstract one or multiple repositories (i.e., subscription data 430, profile data 435, policies 440, or other resources 615). Such a configuration simplifies system 500 by factoring out of policies data aggravation/federation, mapping, and identity management/federation. Specifically, in FIG. 13, OSS/BSS 306 is added to provide data driven synchronization. OSS/BSS 306 may manage data and the data may update OSS/BSS 306 via SOA database management.

Figure 14:
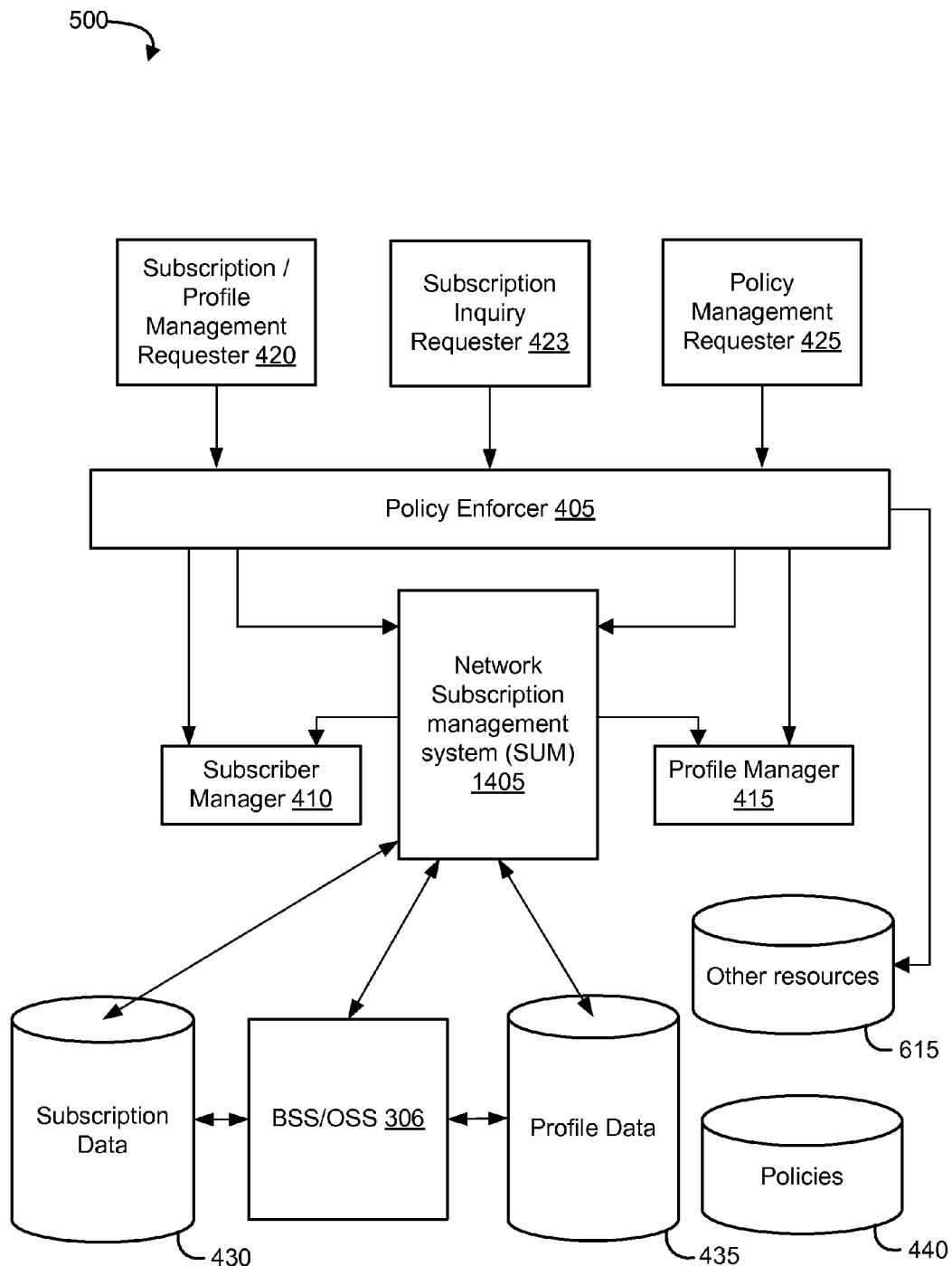
FIG. 14 is a block diagram illustrating, at a high-level, functional components of a system for implementing service level consolidated user information management according to a further embodiment of the present invention.
Figure 15:
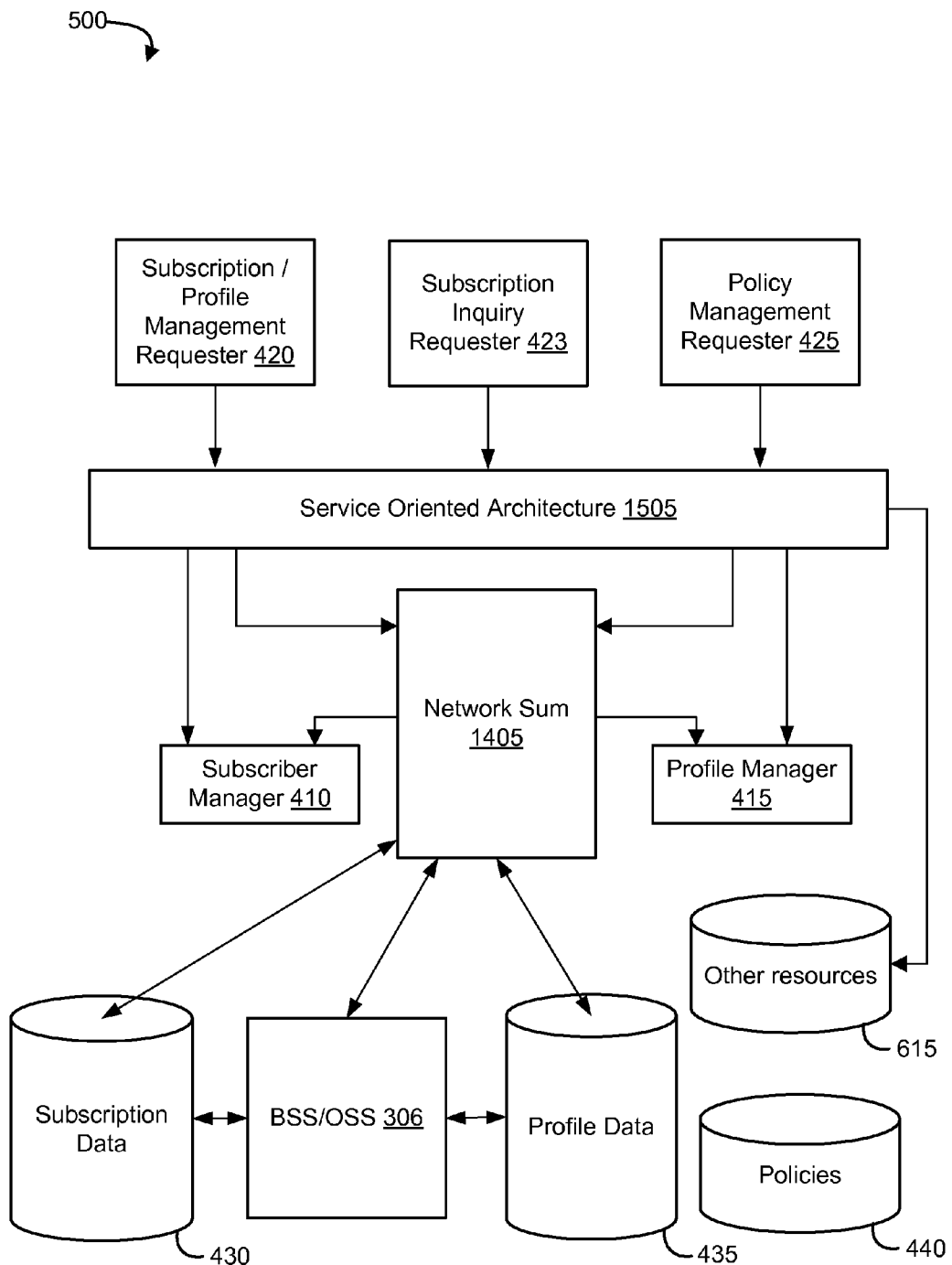
FIG. 15 is a block diagram illustrating, at a high-level, functional components of a system for implementing service level consolidated user information management according to a further embodiment of the present invention.

Turning now to FIGS. 14 and 15 which are block diagrams further illustrating, at a high-level, functional components of a system 500 (FIG. 5) for implementing service level consolidated user information management according to another embodiment of the present invention. Alternatively, instead of updating applications (i.e., OSS/BSS 306), a network subscription management system (SUM) 1405 may be updated. Network SUM 1405 is then responsible for synchronizing the OSS/BSS 306 and, by implication, the data. Furthermore, FIG. 15 may include a SOA 1505 as opposed to a policy enforcer 405 (FIG. 14).

Figure 16:
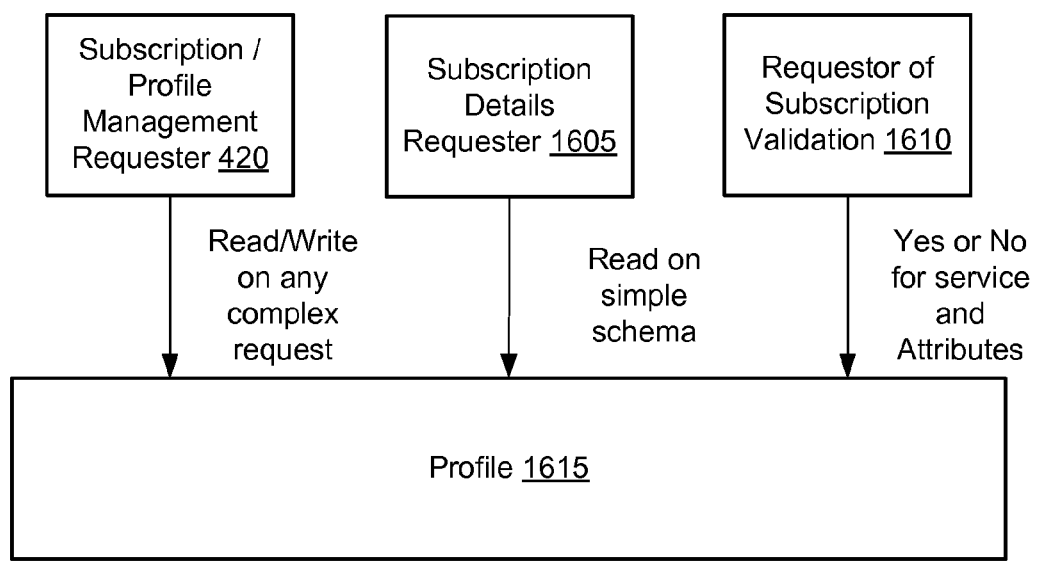
FIG. 16 is a block diagram illustrating, at a high-level, functional components of a system for implementing service level consolidated user information management according to a further embodiment of the present invention.

Turning now to FIG. 16 which is a block diagram further illustrating, at a high-level, functional components of a system 500 (FIG. 5) for implementing service level consolidated user information management according to another embodiment of the present invention. In one embodiment, Subscription/Profile Management Requester 420 is configured to read and/or write to profile 1615 in response to any complex request. Further, subscription details requester 1605 is configured to read from profile 1615 in response to a simple schema request. In addition, requester of subscription validation 1610 provides a "yes" or a "no" to profile 1615 for service and attribute requests.

Figure 17:
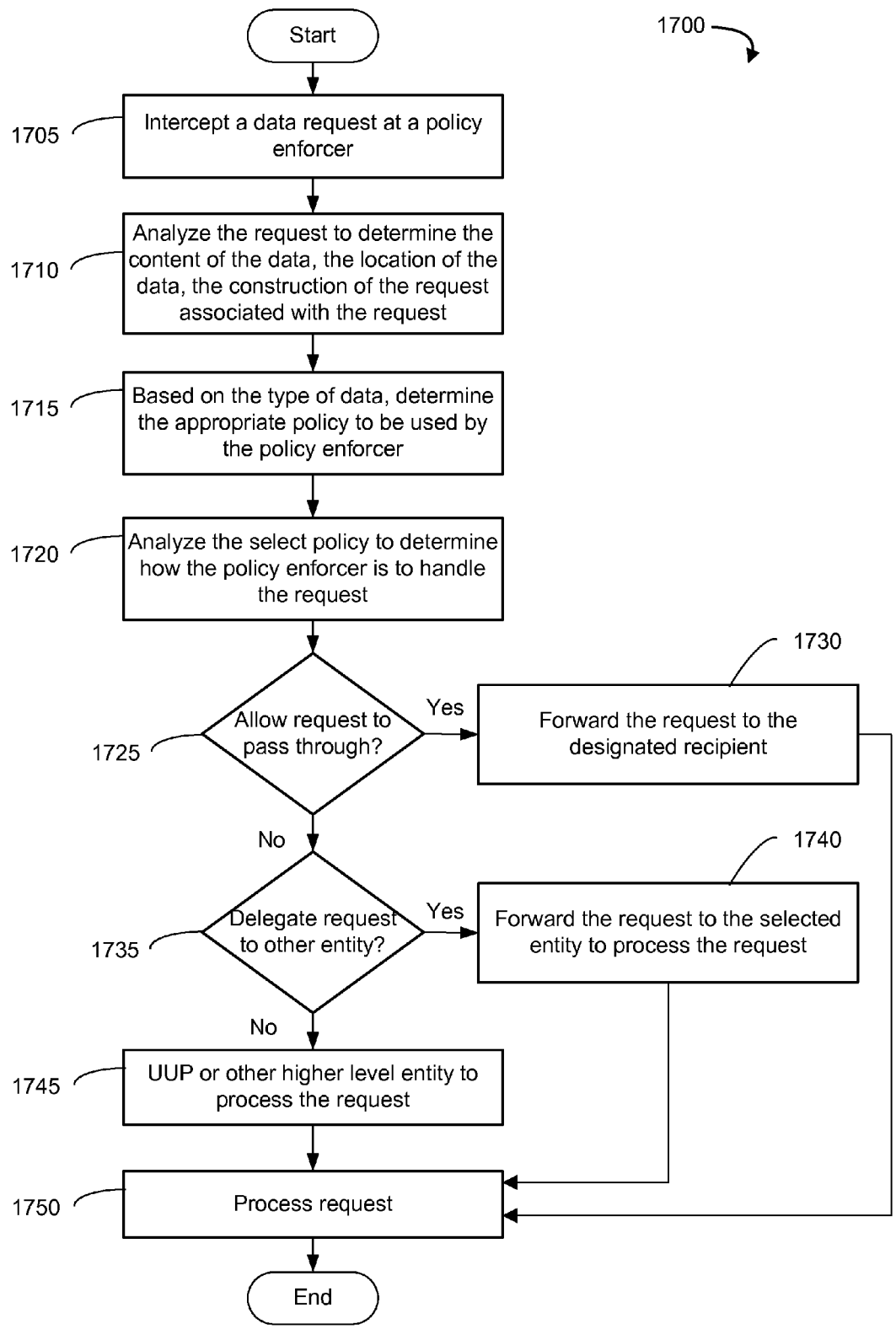
FIG. 17 is a flowchart illustrating a process for implementing service level consolidated user information management according to one embodiment of the present invention.

FIG. 17 is a flowchart illustrating a process for implementing service level consolidated user information management according to one embodiment of the present invention. In this example, processing begins with a policy enforcer (i.e., policy enforcer 405 (FIGS. 4 and 5)) intercepting a data manipulation request (process block 1705). The request may be to make changes to, for example, a user profile, user information, user subscription information, user preferences, etc. Furthermore, the request may include a destination data system or associated data system which "owns" the data.

At process block 1710, the request may be analyzed to determine the content of the data, the location of the data, the construction of the request, etc. associated with the request as well as the owner of the data. For example, the data may be customer profile information and the owner of the data may be a profile manager. Accordingly, based on the type and owner of the data, an appropriate policy may be selected to be used by the policy enforcer for the request (process block 1715). In one embodiment, the policy may be selected from multiple policies stored in a policy database. The policies may also be updated and/or modified, or new policies may be added to the policy database.

As discussed above, policies include a number of conditions and commands which instruct the policy enforcer as to how to handle various data manipulation requests. Hence, at process block 1720, the selected policy may be analyzed to determine how the policy enforcer is to handle the received request. In one embodiment, the policy may provide the policy enforcer with routing instructions. For example, the policy may instruct the policy enforcer to directly handle the request itself, to pass the request through the UUP 304 (FIGS. 3(*a*) and 3(*b*)) or higher level APIs, or to delegate processing of the request to the owner of the data (e.g., to another data system, application, set of processes (e.g., OSS/BSS 306 (FIGS. 3(*a*) and 3(*b*))), etc.). Thus, the policy enforcer 405 (FIGS. 4 and 5) orchestrates and manages the routing of all of the requests.

Accordingly, at decision block 1725, it may be determined whether the policy enforcer is to allow the request to pass through to the owner of the data. If it is determined that the owner of the data is to process the request, then at process block 1730, the request may be forwarded to the owner of the data by the policy enforcer. Subsequently, the manipulation request may then be processed and the data changed (process block 1750).

Alternatively, if it is determined that the request is not to be allowed to pass through to the data owner, then it is determined whether the request is to be delegated to a data system (decision block 1735). Hence, if it is determined that the manipulation request is to be delegated to a data system, then the request is forwarded to the selected data system to handle the request (process block 1740). Then, the request is processed by the selected data system (process block 1750).

However, if it is determined that the request is not to be delegated to a data system, then it is determined that the UUP 304 (FIGS. 3(*a*) and 3(*b*)) (or other higher level entity) is to handle the request directly (process block 1745). As such, the policy enforcer 405 (FIGS. 4 and 5) can proceed to access the data and make the requested change (process block 1750). Accordingly, the policy enforcer is able to direct all requests to manipulate data, and data synchronization and consistency is able to be effectively maintained by a centralized entity.

In the foregoing description, for the purposes of illustration, methods were described in a particular order. It should be appreciated that, in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of implementing service level consolidated user information management, the method comprising:
   providing, by a computer system executing a policy enforcer, a common interface to a plurality of data systems, the common interface providing an aggregated view of user data stored on the plurality of data systems;
   providing, by the computer system through the common interface a unified user profile (UUP);
   obtaining, by the computer system via the common interface, access to each of the plurality of data systems;
   intercepting, by a computer system executing a policy enforcer, a manipulation request, the manipulation request comprising a request to manipulate user information of at least one of the plurality of data systems;
   analyzing the request, by the computer system executing the policy enforcer, to determine which data the manipulation request is associated with;
   based on the associated data, selecting, by the computer system executing the policy enforcer, a policy from a plurality of policies configured for enforcement related to the associated data; and
   executing, by the computer system executing the policy enforcer, the selected policy, wherein the policy is configured to direct the policy enforcer to delegate processing of the manipulation request to at least one of the plurality of data systems.

2. The method of claim 1, further comprising verifying, by the computer system executing the policy enforcer, that the policy enforcer and the at least one of the plurality of data systems have permissions to manipulate the data.

3. The method of claim 1, further comprising returning an error message to the requestor through the common interface when a failure is expected to result in the UUP.

4. The method of claim 1, wherein the data includes dependent data, wherein the dependent data comprises data which is changed in response to the data changing.

5. The method of claim 4, further comprising in response to the manipulation request affecting the dependent data, changing the dependent data.

6. The method of claim 1, wherein the manipulation request is a subscription management manipulation request, wherein the subscription management manipulation request comprises information about a user(s).

7. The method of claim 1, wherein the manipulation request is a profile management manipulation request, wherein the profile management manipulation request comprises data about preferences and/or information about a user(s).

8. The method of claim 1, wherein the manipulation request includes an associated destination data system.

9. The method of claim 8, wherein the destination data system owns the data.

10. The method of claim 1, wherein the data's location is known at the time of the request, and the request is made through the common interface.

11. The method of claim 10, wherein the request made through the common interface includes information as to how the data is to be mapped.

12. The method of claim 1, further comprising returning an error message in response to the manipulation request through a requestor interface when the request fails.

13. A system comprising:
   a processor; and
   a memory coupled with and readable by the processor and storing a set of instructions for implementing service level consolidated user information management which, when executed by the processor, causes the processor to execute a policy enforcer, the policy enforcer configured to provide a common interface to a plurality of data systems, the common interface providing an aggregated view of user data stored on the plurality of data systems, provide, through the common interface a unified user profile (UUP), obtain, via the common interface, access to each of the plurality of data systems, intercept a manipulation request, the manipulation request comprising a request to manipulate user information of at least one of the plurality of data systems, analyze the request to determine which data the manipulation request is associated with, based on the associated data, select a policy from a plurality of policies configured for enforcement related to the associated data, and execute the selected policy, wherein the policy is configured to direct the policy enforcer to-delegate processing of the manipulation request to at least one of the plurality of data systems.

14. The system of claim 13, further comprising executing an aggregator/federator configured to aggregate and/or federate the data, provide managed identities, and aggregate/federate schemas for the data.

15. The system of claim 14, wherein the aggregator/federator is further configured to map data to be completed by an administrator at installation or run time, and that is exposed and controlled programmatically via a plurality of interfaces.

16. The system of claim 13, wherein at least one of the plurality of data systems is a business support system (BSS), operations support system (OSS), a billing system, a subscription system, a service system, a network system, or a profile management system.

17. The system of claim 16, wherein the policy enforcer delegates the processing of the manipulation request to the BSS.

18. The system of claim 13, further comprising a policy repository to store the plurality of policies.

19. A machine-readable memory for implementing service level consolidated user information management which, when executed by a machine, causes the machine to:
   provide a common interface to a plurality of data systems, the common interface providing an aggregated view of user data stored on the plurality of data systems;
   provide, through the common interface a unified user profile (UUP);
   obtain, via the common interface, access to each of the plurality of data systems;
   intercept, at a policy enforcer, a manipulation request, the manipulation request comprising a request to manipulate user information of at least one of the plurality of data systems;
   analyze the request to determine which data the manipulation request is associated with;
   based on the associated data, select a policy from a plurality of policies configured for enforcement related to the associated data; and execute the selected policy, wherein the policy is configured to direct the policy enforcer to delegate processing of the manipulation request to at least one of the plurality of data systems.

* * * * *

UNITED STATES PATENT AND TRADEMARK OFFICE
CERTIFICATE OF CORRECTION

| | | |
|---|---|---|
| PATENT NO. | : 8,533,773 B2 | Page 1 of 1 |
| APPLICATION NO. | : 12/948450 | |
| DATED | : September 10, 2013 | |
| INVENTOR(S) | : Maes | |

It is certified that error appears in the above-identified patent and that said Letters Patent is hereby corrected as shown below:

In the Specifications

In column 7, line 37, delete "may be" and insert -- maybe --, therefor.

In column 15, line 4, delete "inqueries." and insert -- inquiries. --, therefor.

Signed and Sealed this
Seventeenth Day of December, 2013

Margaret A. Focarino
*Commissioner for Patents of the United States Patent and Trademark Office*